(12) United States Patent
Bryant et al.

(10) Patent No.: US 8,375,851 B2
(45) Date of Patent: Feb. 19, 2013

(54) APPARATUS AND METHODS FOR LOADING SOFT MATERIALS

(75) Inventors: Stephanie Bryant, Boulder, CO (US); Garret Nicodemus, Broomfield, CO (US); Idalis Villanueva, Bethesda, MD (US); Dana S. Hauschulz, Boulder, CO (US); Dragan Mejic, Brighton, CO (US)

(73) Assignee: The Regents of University of Colorado, Denver, CO (US)

( * ) Notice: Subject to any disclaimer, the term of this patent is extended or adjusted under 35 U.S.C. 154(b) by 522 days.

(21) Appl. No.: 12/616,113

(22) Filed: Nov. 10, 2009

(65) Prior Publication Data

US 2010/0144007 A1 Jun. 10, 2010

Related U.S. Application Data

(60) Provisional application No. 61/113,566, filed on Nov. 11, 2008.

(51) Int. Cl.
 *B30B 1/14* (2006.01)

(52) U.S. Cl. .................................... 100/281; 100/282
(58) Field of Classification Search .............. 100/280, 100/281, 282, 283, 285, 286, 293; 72/450, 72/451; 74/42
See application file for complete search history.

(56) References Cited

U.S. PATENT DOCUMENTS

| | | | | |
|---|---|---|---|---|
| 2,054,428 A | * | 9/1936 | Klocke | 72/446 |
| 5,823,087 A | * | 10/1998 | Eigenmann | 83/630 |
| 6,871,586 B2 | * | 3/2005 | Teraoka | 100/49 |

\* cited by examiner

*Primary Examiner* — Jimmy T Nguyen
(74) *Attorney, Agent, or Firm* — Don D. Cha; Hamilton DeSanctis & Cha

(57) ABSTRACT

The present invention provides an apparatus for loading soft materials and methods for using the same. In some embodiments, the apparatus is a gearless mechanical loading apparatus which converts a rotational movement of one end of a first element into an arc of a circle movement of the other end of the first element; and converts the arc of a circle movement of the other end of the first element into a precision two-dimensional lateral movement of a second element.

7 Claims, 9 Drawing Sheets

APPARATUS AND METHODS FOR LOADING SOFT MATERIALS

CROSS-REFERENCE TO RELATED APPLICATIONS

This application claims the priority benefit of U.S. Provisional Application No. 61/113,566, filed Nov. 11, 2008, which is incorporated herein by reference in its entirety.

FIELD OF THE INVENTION

The present invention relates to an apparatus for loading soft materials and methods for using the same.

BACKGROUND OF THE INVENTION

Soft material loading apparatuses have a wide variety of applications including research and development of tissue samples. For example, such apparatuses enable one to study the changes in the biochemistry and physiology of cultured cells under conditions of mechanical strain as compared to cells grown conventionally under quiescent conditions. In addition, such apparatuses allow one to culture cells in 3D matrices or tissue explants in simulated physiological conditions, thereby providing cells and/or tissues that are suitable for surgical implants.

Without being bound by any theory, it is believed that mechanical stimulation of cells is believed to influence the biochemistry and physiology of cells. Such a stimulation provides enhanced production and, therefore, improved harvesting efficiency of biochemical products from these cells. Various systems have been proposed previously for growing cells in culture and/or tissues. A few systems have attempted to account for the natural mechanical environment of cells or tissues. One typical conventional system attempts to uniaxially elongate smooth muscle cells in culture (see, for example, Leung, D., et al, *Science*, 1976, 191, 475-477), but fails in part because uniaxial stretch is not physiologic and the strain distribution in this system is not uniform and, therefore, not well-characterized for the population of cells stimulated.

In another conventional system, cells in culture are subjected to a uniform shear strain, constant in magnitude and direction. See, for example, Davies, P. et al, *J. Clin. Invest.* 1984, 73, 1121-1129. This system is not generally applicable because inter alia (1) endothelial cells are the only cells subjected to shear strain in vivo thereby limiting its applicability to only this one cell type and (2) shear strain in vivo occurs simultaneously with biaxial tension, and, by uncoupling the two, the true mechanical environment of endothelial cells is not reproduced.

Regardless of the application, conventional soft matter loading instruments typically use direct drive electromagnetic armatures. The advantages of direct drive include speed and controllability while utilizing minimal moving parts. However, the deliverable force tends to be small because the conversion of electrical energy into useable mechanical work is extremely poor. Most of the energy winds up as heat dissipated in the electromagnet.

Accordingly, there is a need for soft material loading apparatuses that do not utilize conventional direct drive electromagnetic armatures. There is also a need for soft material loading apparatuses that can provide artificial conditions sufficient to allow production of tissue samples that are suitable for surgical implants.

SUMMARY OF THE INVENTION

The present invention provides a mechanical loading apparatus that does not utilize direct drive electromagnetic armatures and methods for using the same. Some aspects of the invention provide a gearless mechanical loading apparatus that is capable of transforming a non-linear motion into a substantially pure linear motion. In some embodiments, the gearless mechanical loading apparatus comprises:
  a motor;
  a crank element operatively connected to the motor and comprising:
    a crank arm, and
    a driver link comprising:
      a proximal end that is operatively connected to the crank arm by a driver link connector, and
      a distal end, whereby when the motor rotationally moves the crank arm, the rotational movement of the crank arm causes the distal end of the driver link to move in an arc;
  a joint element operatively connected to the driver link and comprising:
    a first compression element comprising a proximal end and a distal end, wherein the distal end of the first compression element is configured such that there is no lateral movement of the distal end of said first compression element,
    a second compression element comprising a proximal end and a distal end, and
    a main knuckle comprising a hinge that interconnects the proximal ends of the first and second compression elements with the distal end of the driver link; and
  a linear displacement element comprising:
    a displacement arm comprising:
      a proximal end that is operatively connected to the distal end of the second compression element; and
      a distal end; and
    a guide element operatively connected to the displacement arm such that the guide element causes a substantially pure linear movement of the displacement arm when the distal end of the second compression creates movement of the displacement arm.

In some embodiments, the guide element comprises a piston like element. The piston like element is operatively connected to the displacement arm and the second compression element such that the movement of the distal end of the second compression element causes purely a linear movement of the displacement arm.

Still in other embodiments, the apparatus further comprises a platen that is operatively connected to the distal end of the displacement arm; and a base adapted for placing a material to be compressed by the mechanical loading apparatus. In these embodiments, a lateral movement of the displacement arm causes the platen to move toward or away from the base thereby compressing or uncompressing, respectively, the loaded sample.

Yet in other embodiments, the apparatus further comprises a sample holder element that is operatively connected to the distal end of the displacement arm and is adapted to attaching a sample; and a sample placement element adapted for removably attaching a sample. In these embodiments, lateral movement of the displacement arm causes the sample holder element to move toward or away from the sample placement element thereby (i) stretching or unstretching the sample or (ii) compressing or uncompressing the sample.

Apparatuses of the invention are not limited to stretching or compressing materials. Apparatuses of the invention can also be used in devices that could also apply shear such that the displacement arm moves laterally but is translated to the sample through a rotational movement.

In other embodiments, the lateral movement of the displacement arm is about 10 mm or less. Typically, the total lateral movement of the displacement arm is about 5 mm or less. Often the lateral movement of said displacement arm is about 3 mm or less.

In general, apparatuses of the invention are designed as a strain-based system; thus, it is typically designed to produce desired strain regardless of the force it requires. In many embodiments, the typical force exerted by apparatuses of the invention is determined or based on the modulus of the constructs or materials that are place in the apparatus. For example, generally in practical applications for cells or tissue materials, the stiffest constructs require about 4 N of force to apply 20% strain to one construct. For 12 samples that are loaded, the total force required is about 48 N. Typically, the weakest cell or tissue culture samples require about 0.2 N of force to apply a 20% strain, and therefore only about 2.4 N for 12 samples.

Other aspects of the invention provide a mechanical loading system comprising a mechanical loading apparatus disclosed herein and a control unit that is operatively connected to the mechanical loading apparatus. The control unit is adapted for controlling the operation of the mechanical loading apparatus. In some embodiments, the control unit is removably attached to the mechanical loading apparatus. In this manner, different control units can be attached and removed. In other embodiments, the control unit is programmable. This allows one to utilize the mechanical loading apparatus of the invention in a wide variety of applications. In some embodiments, the control unit comprises a central processing unit.

Still other aspects of the invention provide methods for providing a precision two-dimensional lateral movement of an element. Such methods include converting a rotational movement of one end of a first element into an arc of a circle movement of the other end of the first element; and converting the arc of a circle movement of the other end of the first element into a precision two-dimensional lateral movement of a second element.

In some embodiments, the step of converting the arc of a circle movement to precision two-dimensional lateral movement comprises restricting the movement of the second element to two-dimensional lateral movement by a linear displacement element. Within these embodiments, in some instances the linear displacement element comprises a piston.

Other aspects of the invention provide method for producing a bioengineered tissue, said method comprising applying compressive or tensile strains to a tissue sample using a gearless mechanical loading apparatus described herein. Application of the compressive or tensile strain changes the physical property of the tissue sample compared to a similar tissue sample in the absence of the compressive or tensile strain. In some embodiments, the tissue sample is present within a matrix of a polymer.

Apparatuses of the invention can also be used to study polymer degradation, diffusion of molecules through polymers in response to loading, etc.

DETAILED DESCRIPTION OF THE INVENTION

Figure 1:
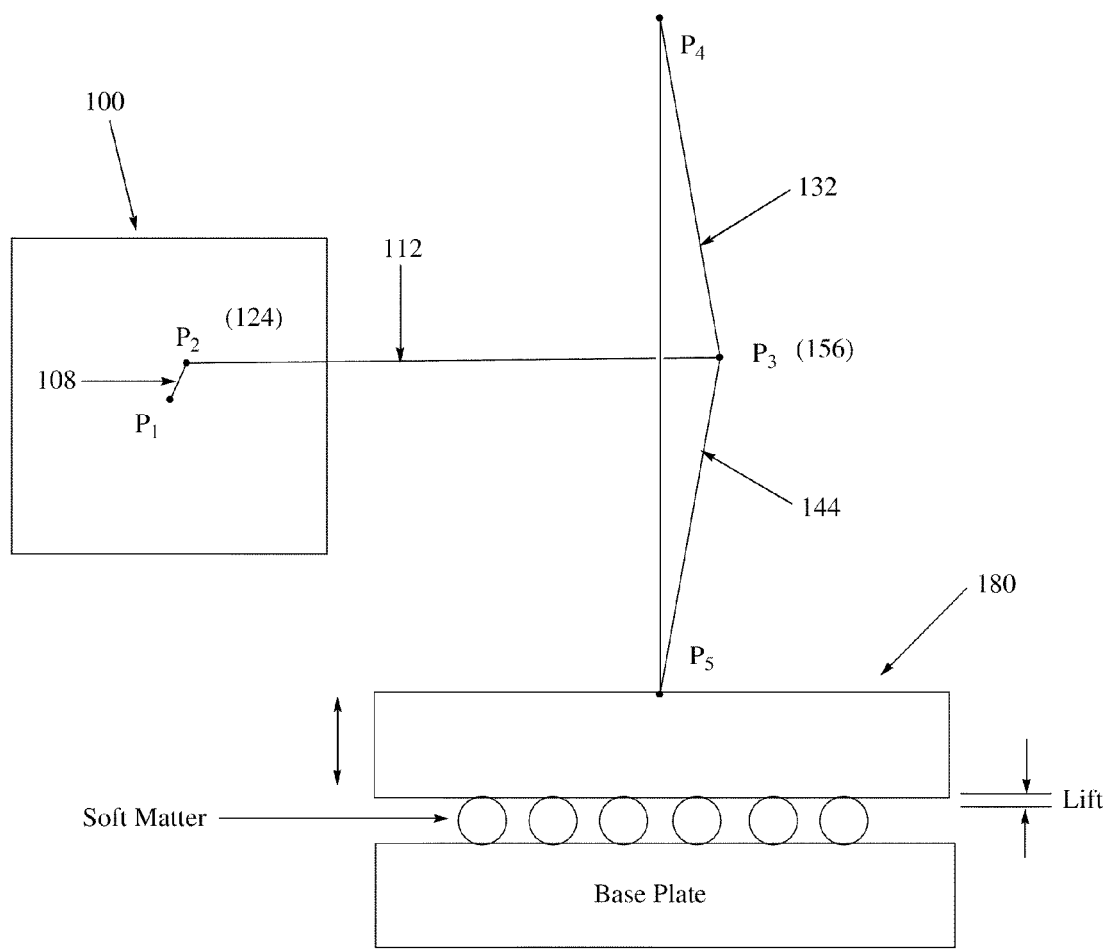
FIG. 1 is a schematic illustration of one of the principles utilized in soft material loading apparatuses of the present invention.
Figure 2:
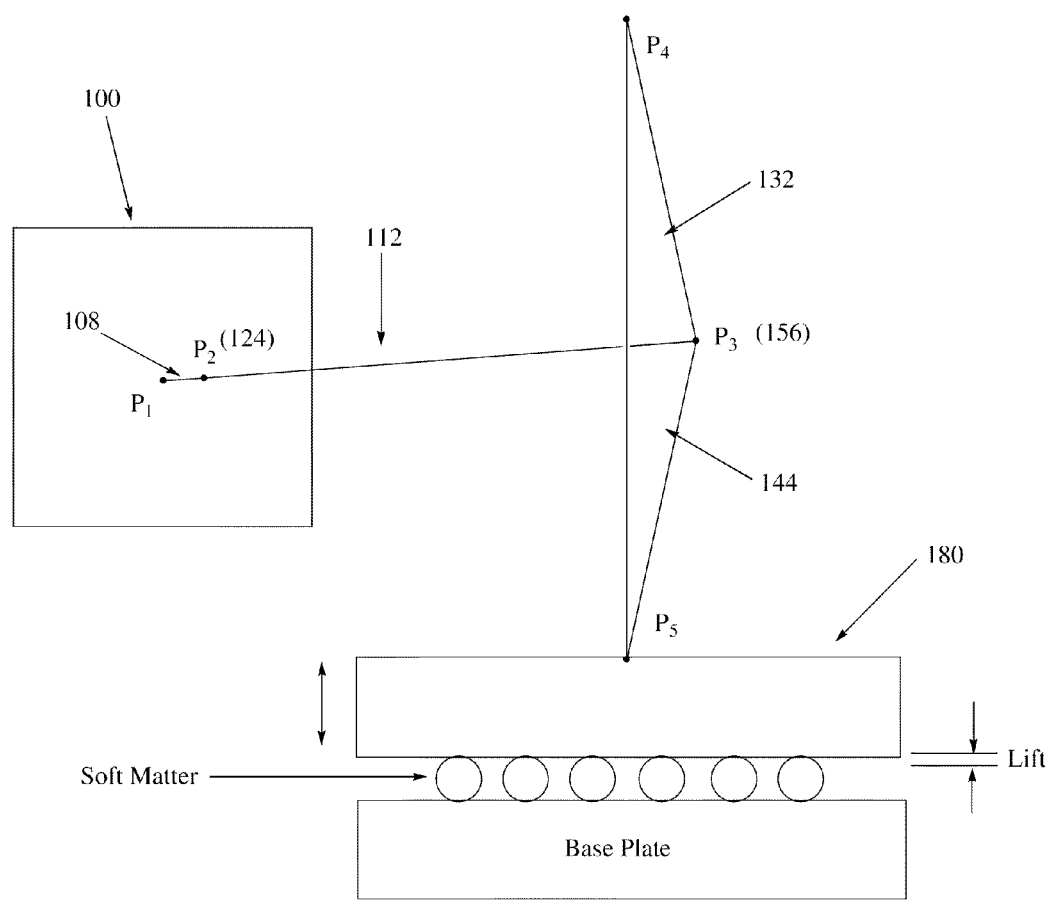
FIGS. 2-5 illustrate a sequence of motion of the drive mechanism of some of the apparatuses of the present invention.

The present invention will be described with regard to the accompanying drawings which assist in illustrating various features of the invention. In this regard, the present invention generally relates to soft material loading apparatuses and methods for using the same. That is, the invention relates to apparatuses that can compress (or stretch) one or more soft matter samples under static or dynamic compression. In some embodiments, apparatuses of the invention can compress soft matter samples with high positional accuracies.

One particular embodiment of the apparatuses of the present invention and one of the underlying mechanical principles is generally illustrated in FIGS. 1-6, which are provided for the purpose of illustrating the practice of the present invention and which do not constitute limitations on the scope thereof.

Referring to FIGS. 1-7B, some aspects of the invention provide a gearless mechanical loading apparatus. As schematically illustrated in accompanying figures, apparatuses of the invention include a motor 100 and a crank element 104 that is operatively connected to the motor 100. The crank element 104 comprises a crank arm 108, and a driver link 112. The driver link 112 comprises a proximal end 116 that is operatively connected to said crank arm 108 and a distal end 120. When motor 100 rotationally moves crank arm 108, the rotational movement of crank arm 108 causes the distal end 120 of driver link 112 to move in an arc. Typically, the distal end 120 moves back and forth in a pendulum-like motion. The connection between proximal end 116 of driver link 112 and crank arm 108 typically is achieved by a hinge, a ball and socket like element, or any other joint element 124 that allows driver link 112 to move in a substantially back and forth lateral motion, which causes the distal end 120 to move in an arc or arc-like path.

Apparatuses of the invention also include a joint element 128 that is operatively connected to driver link 112. The joint element 128 comprises a first compression element 132 comprising a proximal end 136 and a distal end 140. Distal end 140 of compression element 104 is configured to be fixed such that there is no lateral movement. Joint element 128 also includes a second compression element 144 comprising a proximal end 148 and a distal end 152. In addition, joint element 128 comprises a main knuckle 156 comprising a joint 160 that interconnects the proximal ends 136 and 148 of first and second compression elements 132 and 144, respectively, with distal end 120 of driver link 112.

Apparatuses of the invention further include a linear displacement element 164 that is adapted for providing a linear, often two-dimensional, motion. See FIGS. 6A-7B. As used herein, "two-dimensional motion" refers to movement of an element that is substantially all linear, i.e., at least 95% or more of the motion, typically at least 99% or more, and often 100% of the motion being linear. Such a linear motion from linear displacement element 164 is achieved by a displacement arm 168 which comprises a proximal end 172 that is operatively connected to distal end 152 of second compression element 144. Linear displacement element 164 converts the movement of distal end 152 of second compression element 144 to linear movement of displacement arm 168. The displacement arm 168 also includes a distal end 176.

Apparatuses of the present invention can compress one or more soft matter samples under static or dynamic compression without the use of conventional direct drive electromagnetic armatures. In some aspects, apparatuses of the invention can compress soft matter samples with high positional accuracies. One of the features of apparatuses of the present invention is a drive mechanism that offers a set of attributes described herein that are well suited for compressing soft materials. Some aspects of the drive mechanism of the present invention can be considered, in some cases, to functions as a "gearless gear reducer." Such drive mechanism can deliver high force over variable stroke lengths and a variety of programmable velocity profiles.

In some embodiments, the compression stroke of apparatuses of the present invention, e.g., lateral movement of the displacement arm, is about 10 mm or less, typically, about 5 mm or less, and more typically about 3 mm or less. However, it should be appreciated that the compression stroke of apparatuses of the invention is not limited to these specific lateral movement and examples given herein. The compression stroke (e.g., lateral movement of the displacement arm) can vary in order to affect the desired compression of the soft material. Moreover, in other embodiments, the range of linear motion can be resolved, e.g., controlled, precisely, for example, to within 100 µm or less, typically to within 10 µm or less, and often to within 5 µm or less.

Yet in other embodiments, the apparatuses of the present invention are capable of generating a sufficient compressive force to affect the desired strain. It should be appreciated that the compressive force achieved by apparatuses of the present invention is not limited to these specific compressive force and examples given herein. The compressive force can vary in order to affect the magnitude of maximum strain desired.

Apparatuses of the invention often use a significantly less energy than conventional direct drive mechanism used by majority of conventional soft material loading apparatuses. In many instances power consumption of apparatuses of the invention is reduced by as much as 40 fold over current state of the art direct drive electromagnetic drives. Moreover, the energy efficient drive mechanism of the present invention does not dissipate excess heat, and therefore can be placed in an incubator for loading biological specimen.

In some embodiments, the basic drive mechanism of the invention consists of an electric motor 100, a crank element 104, three links (e.g., driver link 112, first compression element 132, and second compression element 144) and a slideable platen 180 as shown in FIG. 1. Briefly, the motor turns crank arm 108 which moves driver link 112 (e.g., link B) back and forth in a more or less horizontal movement. The horizontal displacement of driver link 112 is translated into a precise linear (e.g., vertical) motion through the combined action of first and second compression elements 132 and 144 (e.g., Links C and D, respectively) acting on a slideable platen 180.

The sequence of motion of the drive mechanism is shown in FIGS. 2-5. Under no compression the platen 180 (FIG. 2) is in the maximum lift position where points P1 and P2 are aligned horizontally with link B. As the crank arm 108 is progressively rotated in a counter clockwise direction (FIG. 3), driver link 112 which is attached to crank arm 108 rotates about the motor axis located at point P1. Crank arm 108 has a relatively short radius R whose endpoint is given as pivot point P2. Proximal end 116 of driver link 112 is connected to crank arm 108 at pivot point P2. Consequently, proximal end 116 of driver link 112 follows the circular path traced by pivot point P2 located at the end of crank arm 108. The opposite end of driver link 112 (i.e., distal end 120) is connected to first compression element 132 (e.g., link C) at pivot point P3. Link C constrains movement of pivot point P3 in a different circular path centered at pivot point P4. Thus, each end of link B is moving in a circle even though the sizes of the paths are not the same. In particular, the left end of link B traces a small circle guided by crank arm 108 while the right hand end traces a small arc of a much larger circle as led by Link C. In fact, the ratio of the two circles is a predominant factor in determining the magnitude of the gearless-gear reduction and serves as one of the key attributes of the drive mechanism.

Figure 3:
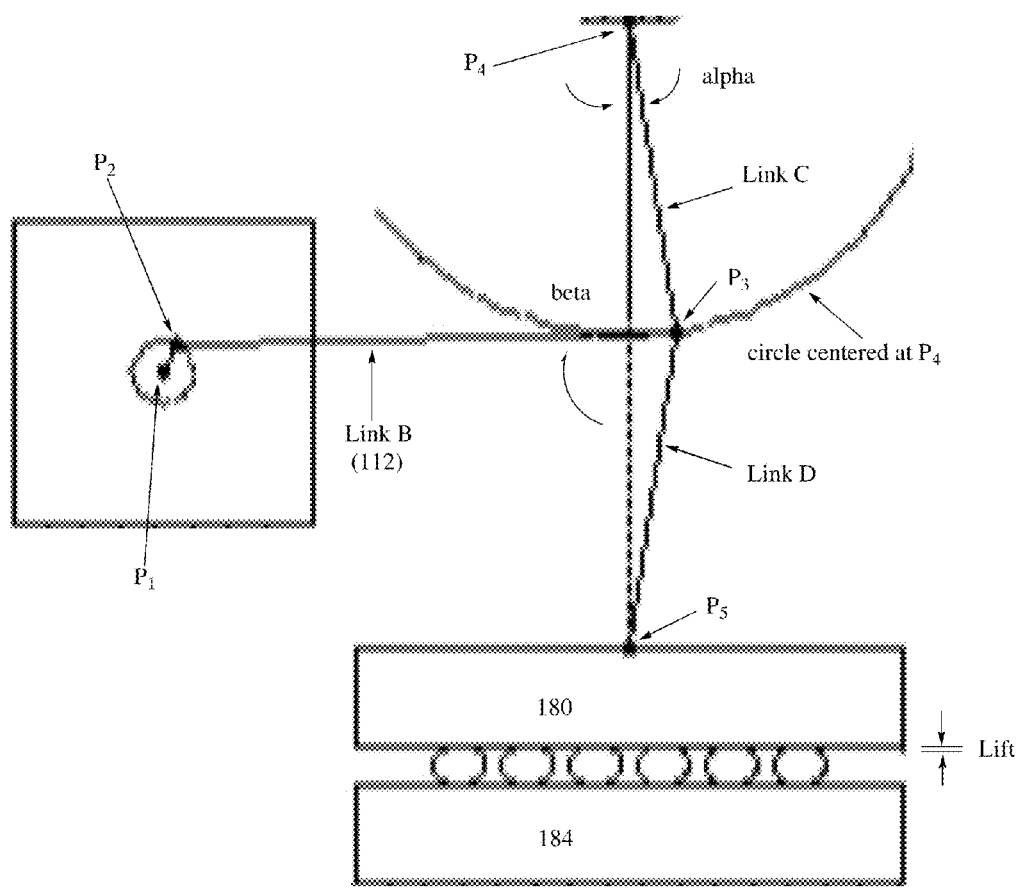
Figure 4:
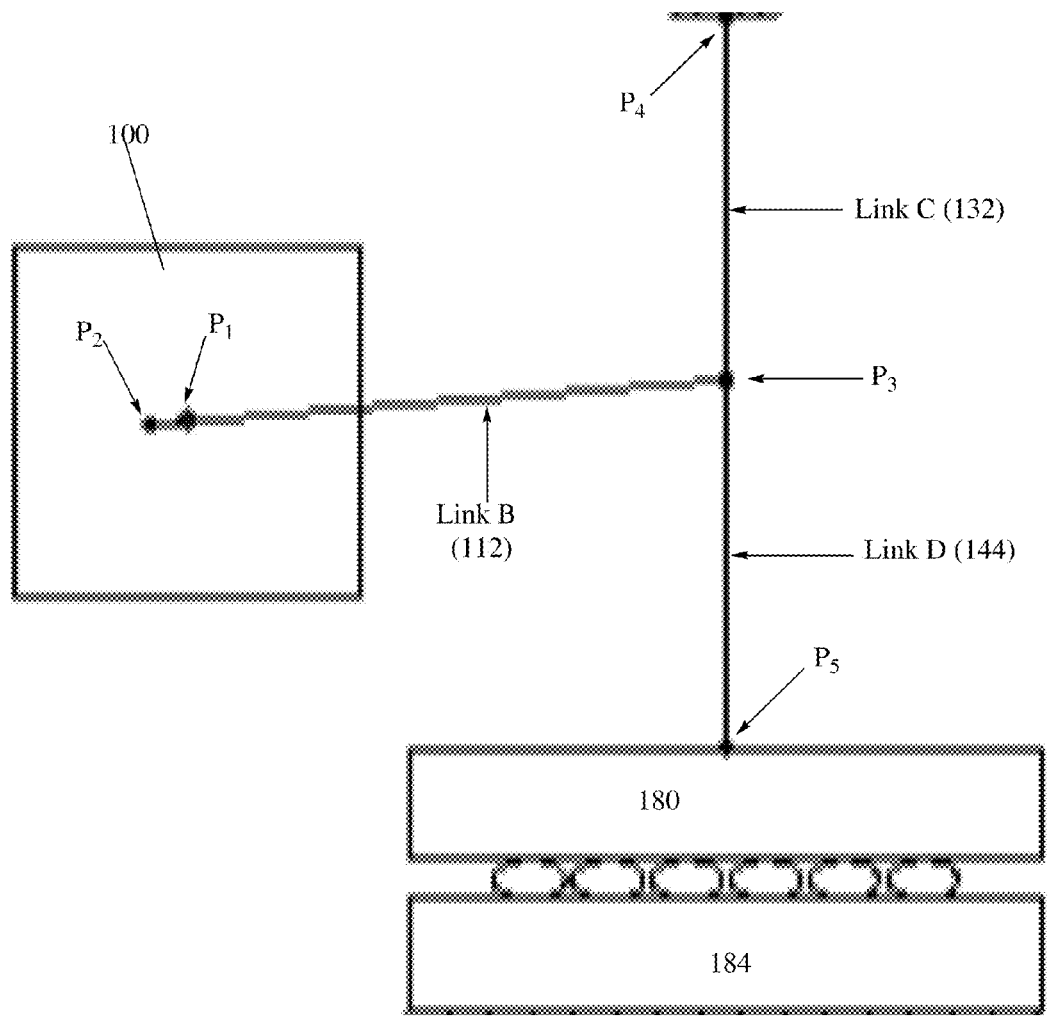
Figure 5:
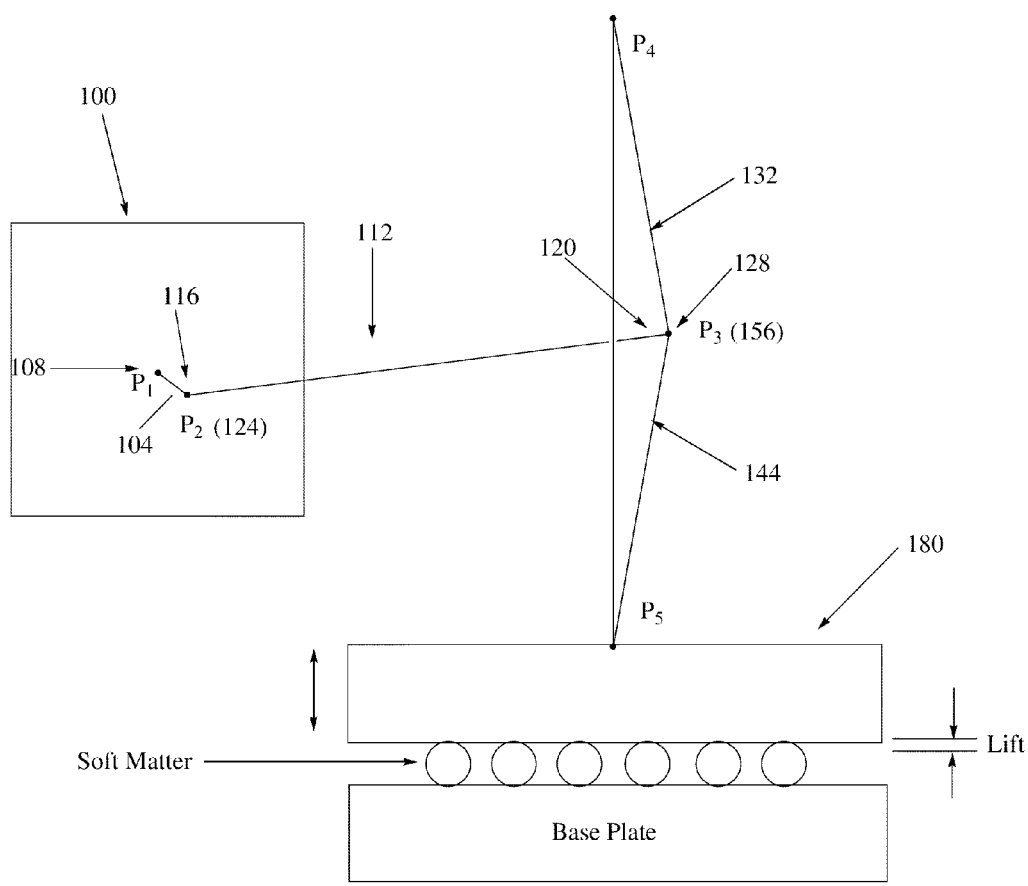
Figure 6A:
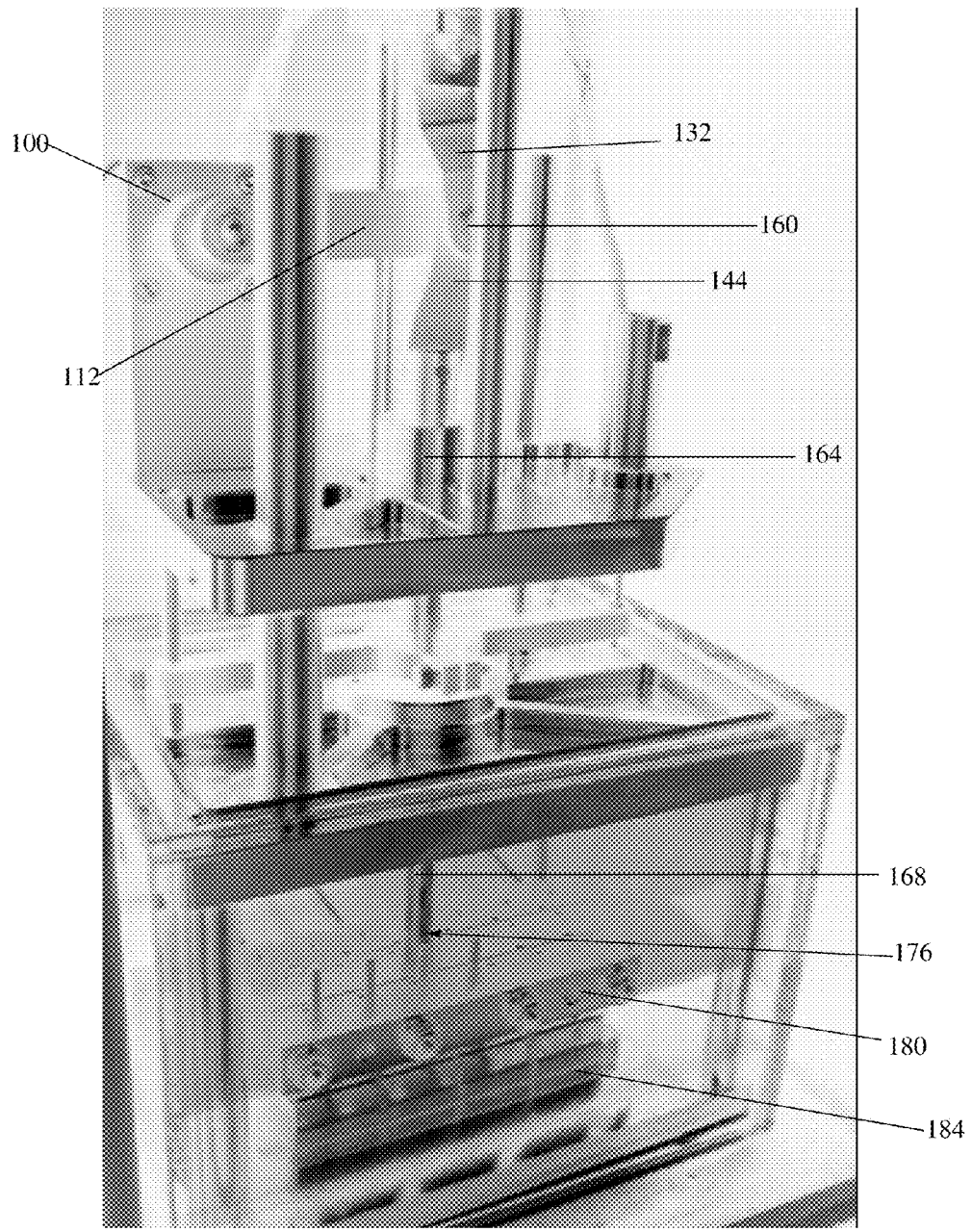
FIGS. 6A and 6B are pictures of one particular embodiment of soft material loading apparatuses of the present invention.
Figure 6B:
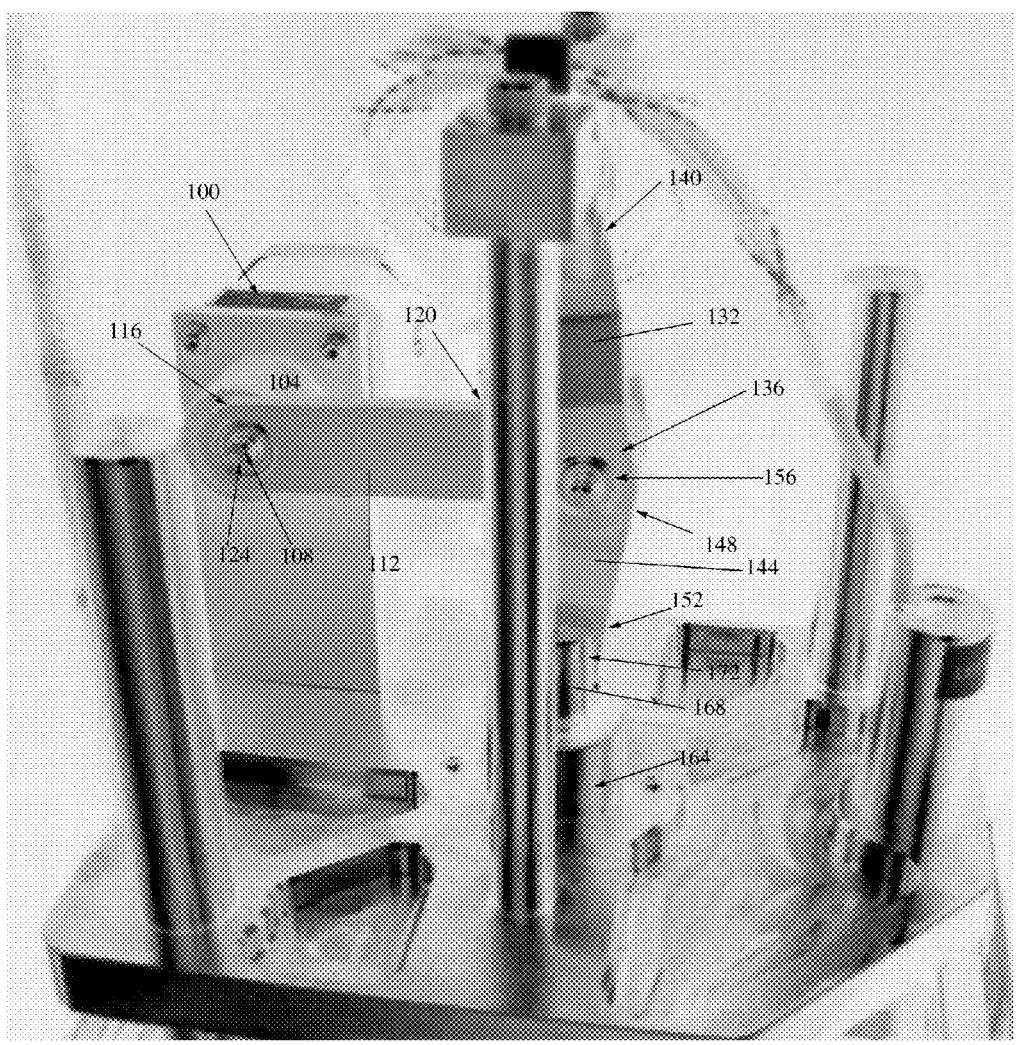
Figure 7A:
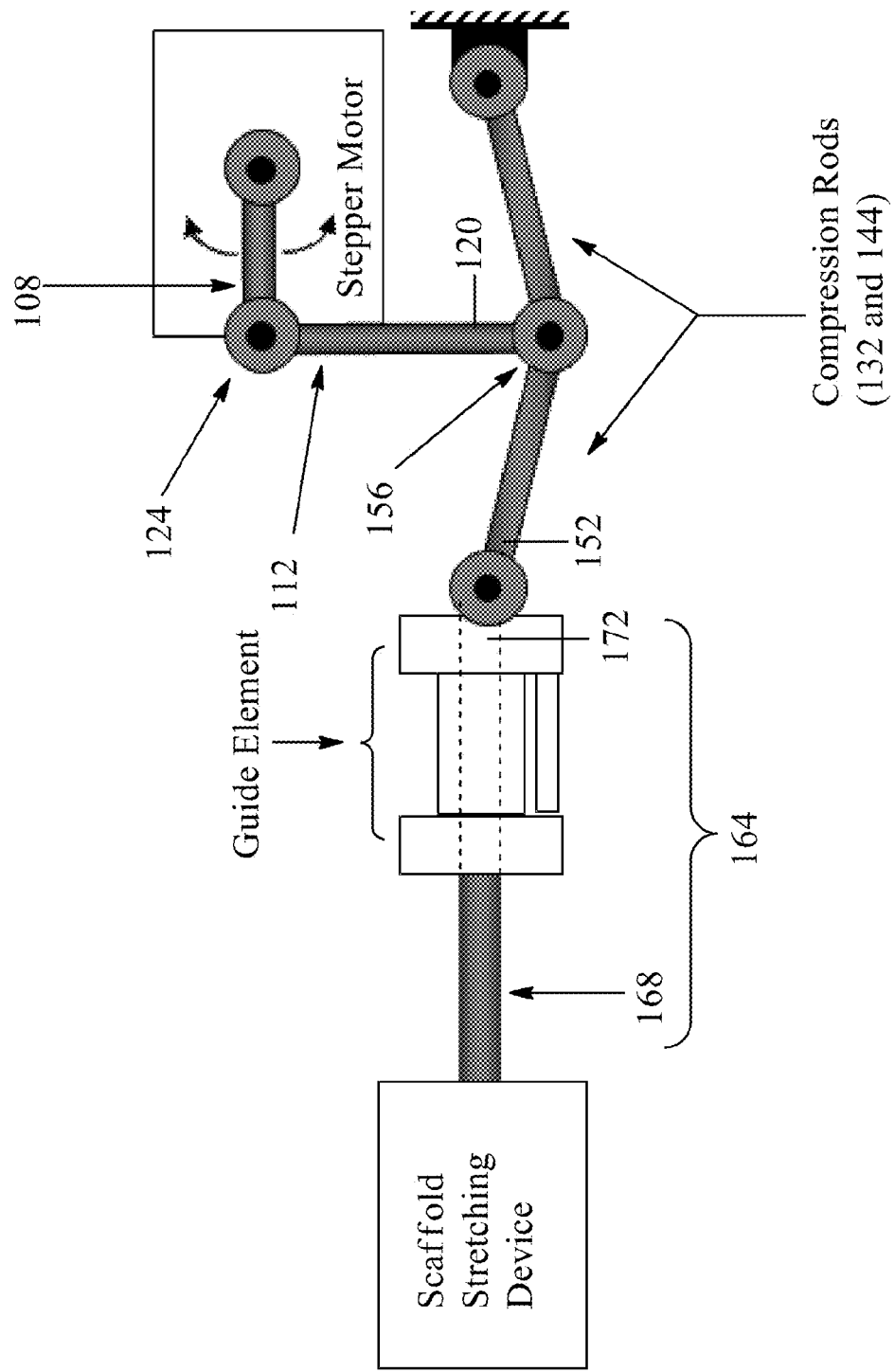
FIG. 7A is a drawing of one particular embodiment of a linear displacement element.
Figure 7B:
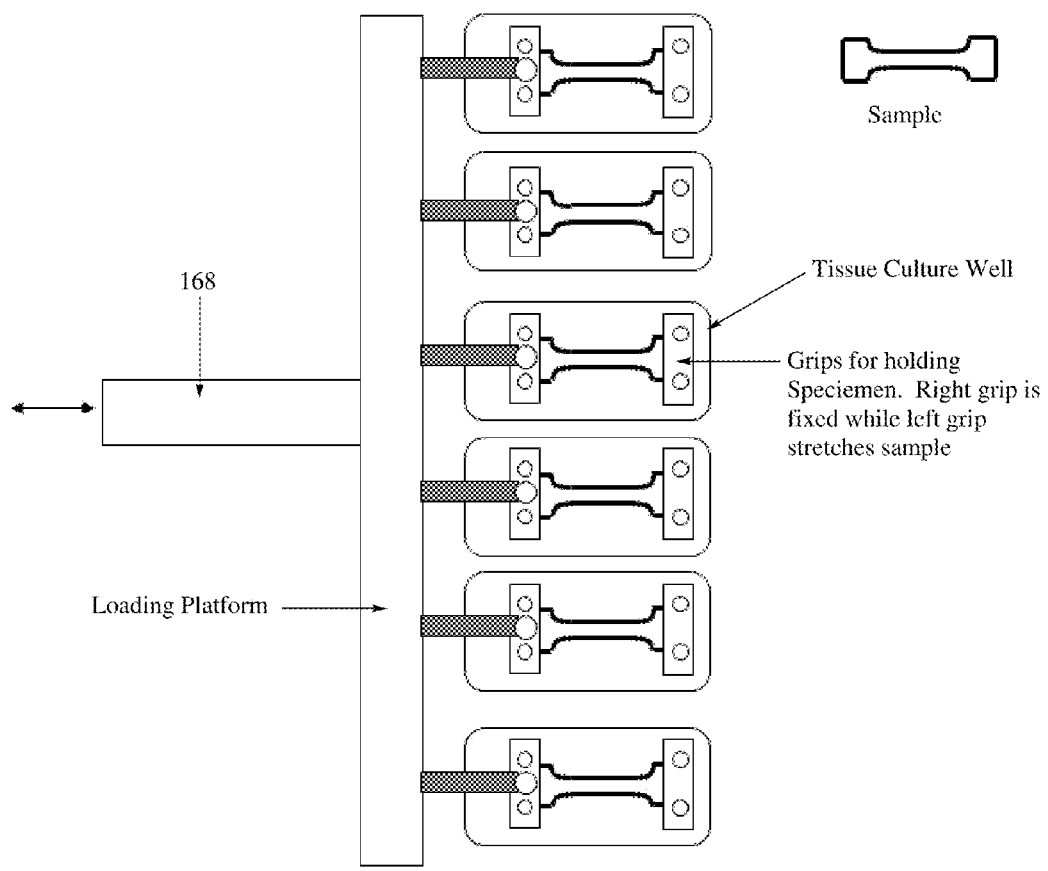
FIG. 7B is a schematic illustration of a displacement arm with grips for holding samples.

When pivot point $P_3$ is driven by Link B, the last of the linkage segments shown as second compression element 144 (e.g., Link D) is taken into motion. The upper end (e.g., proximal end 148) of Link D is connected with Links B and C at pivot point P3. Thus, the upper end of link D is also made to move along the circular arc defined by Link C (FIG. 3). The bottom end of Link D (e.g., distal end 152) denoted by point P5 is attached to a slideable platen 180 that is constrained to move in a pure vertical direction by linear displacement element 164 (see FIGS. 6A-7A). Therefore, as P3 moves to the right, pivot point P5 and the slideable platen 180 move up. Conversely, when P3 moves to the left, pivot point P5 and the platen 180 move down. Maximum compression occurs when P3 is fully extended horizontally to the left as shown in FIG. 4. From this position the platen 180 can once again be raised by either reversing the direction of crank arm 108 rotation or by continuing the counter clockwise rotation of crank arm 108 as shown in FIG. 5. Below the platen 180, a fixed base plate 184 can support an array of soft matter samples. These samples can then be repetitively compressed between the platen 180 and base plate 184 as the platen 180 moves up and down.

Cyclical compression can be achieved by either letting the motor continuously rotate in full circles or by selectively sweeping the crank arm 108 back and forth through a partial circle. Stepper motors or servomotors are well suited for the task of executing well controlled partial rotations of the motor shaft. The magnitude of the circular paths can range from a theoretical zero to a full 360 degree rotation. Complete rotation of the crank gives a maximum compression stroke that is defined by the particular geometry of the drive mechanism. Partial rotations of the crank give correspondingly smaller portions of the stroke all the way down to the limit of zero.

Through appropriate choice of location of the origin of Link C (pivot point P4), a small angle (alpha) can be selected for circle 2 which optimizes both gear reduction and vertical displacement resolution of the platen 180 (see, for example, FIG. 3). Further, typical angle, beta that is found between Link B and Link C is approximately 90 degrees. It is here (small alpha and beta-90 degrees) that large lateral displacements of pivot point P3 produce small and highly resolvable vertical displacements of the platen.

In one specific embodiment, to maximize the ratio of motor steps to the magnitude of sample compression, the crank arm 108 radius was sized to require the stepper motor (Applied Motion Systems, Washington) to utilize the better part of a full rotation. The minimum angular step size for this particular embodiment stepper motor was 200 steps/revolution. This motor was driven by an electronic Gecko G212 motor driver (GeckoDrive, California) and Galil DMC-1417 (Galil Motion Products, USA) motion control card at 20,000 microsteps/revolution. In this configuration, one full revolution of the motor produced about 1.78 mm of compression at the sample. Thus, the compound mechanism is capable of resolving 1 micro step out of 20,000 which translates to 1/20,000×1.78 mm=(0.9 microns. This particular embodiment had repeatable accuracy of ±1 micron, which equal to 0.1% full stroke accuracy when a sample is compressed 1 mm.

In addition to controlling angular position of the motor, the Galil DMC-1417 controller card can also be programmed to control motor angular velocity. Therefore one can produce a variety of velocity profiles for the compression stroke. Sinusoidal, triangular, or some other arbitrary velocity profiles can be imparted to the soft matter samples as long as the requested profile does not exceed the torque limits of the drive motor.

Utility

Apparatuses of the present invention offer a significant cost and size reduction compared to conventional loading instruments. Apparatuses of the present invention can be used in a variety of research and development as well as analytical purposes. Exemplary uses of apparatuses of the invention include, but are not limited to, growing tissue samples for the purposes of supplying surgical implants for patients needing to restore damaged tissue. Apparatuses of the present invention can be configured for compressing hundreds or even thousands of tissue samples simultaneously.

In articular cartilage, the structure of the extracellular matrix (ECM) and its components are essential for the tissue to function properly under normal physiological loads. The ECM is maintained by a balance between anabolic and catabolic activities of the resident chondrocytes in which mechanical forces play a key role. During normal physiological activities, articular cartilage is continuously subjected to stresses that induce strain related deformations in the tissue causing, for example, deformation in the cell membrane, fluid flow, streaming potentials, and hydrostatic pressures. These extracellular events are sensed by the chondrocytes to initiate a cascade of intracellular signaling events that ultimately influence cell metabolism. This process is termed mechanotransduction. However, many of the mechanisms involved in mechanotransduction remain unresolved.

It is well known that when a joint is under or overloaded, mechanotransduction pathways in chondrocytes are altered leading to adverse changes in the cartilage ECM structure. Over time, these abnormal structural changes in the tissue can lead to impaired joint motion, excessive pain and eventually osteoarthritis (OA).

Nitric oxide (NO) is an inter- and intra-cellular signaling molecule in chondrocytes, which has been implicated as a mediator of OA. NO, when stimulated by inflammatory cytokines, has been shown to enhance catabolic activities by chondrocytes and lead to cartilage degradation. For example, NO has been shown to suppress proteoglycan (PG) synthesis, stimulate the production of matrix metalloproteinases, and promote cell cycle arrest. Under hypoxic culture conditions, however, NO has been reported to have a protective role in chondrocytes by promoting anabolic activity, e.g., PG synthesis, in the absence of inflammatory cytokines.

Several 2D and 3D models have been used to examine the role of NO in chondrocyte mechanotransduction. For example, fluid induced shear stress resulted in increased NO production by chondrocytes cultured in monolayer, which was correlated to an increase in PG synthesis. When cartilage explants were subjected to either static compressive strains for 24 h at 0.1 MPa or intermittent compressive strains of 0.5-1 MPa at 0.5 Hz for 6 h, increases in NO production were observed. To isolate the inter-related processes that occur during mechanical loading in native cartilage, several investigators have utilized chondrocytes seeded in agarose as a model system to study pathways involved in cell deformation. In this model system, chondrocytes deform to the same degree as the strain applied to the agarose construct. When agarose constructs were subjected to mechanical loading during early culture times, dynamic loading inhibited NO production and stimulated cell proliferation (CP) and PG synthesis while static loading caused an opposite response. Decreases in NO production were correlated with increases in CP suggesting that cell deformation may play a role in mechanotransduction pathways that involve NO and CP.

Recently, three dimensional crosslinked poly(ethylene glycol) (PEG) hydrogels have been proposed as an alternate model to study chondrocyte deformation and cell response to mechanical loading. An attractive feature of PEG gels is the fact that their properties are readily controlled with high fidelity. For example, PEG gels can be tailored to exhibit properties similar to native cartilage without compromising cell viability or function. When a gross compressive strain was applied to cell seeded PEG hydrogels, the degree of cell deformation was dependent on the crosslinking density. Therefore, PEG hydrogels provide two levels of control over cell deformation through the applied strain and the crosslinking density. When chondrocyte seeded PEG constructs were subjected to dynamic loading at a frequency of 1 Hz during early culture times, CP and PG synthesis were inhibited and this inhibition was further enhanced with increased crosslinking density. This study, however, was limited to examining one loading frequency (1 Hz).

As discussed in detail below, PEG hydrogels were used by the present inventors to examine differences in chondrocyte response under a broader range of gel crosslinking densities and loading conditions (e.g., static loading at 15% compressive strain and dynamic loading at 0.3 Hz or 1 Hz with 15% amplitude strains). Chondrocyte response was measured as a function of total NO production, CP and PG synthesis. To elucidate the role of NO in chondrocyte mechanotransduction, correlations between NO and CP or PG synthesis were assessed. This information not only provides insights into chondrocyte mechanotransduction but also provides suitable loading conditions and hydrogel structures for cartilage regeneration.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Example 1

Chondrocyte Isolation

Full depth articular cartilage was removed under sterile conditions from the metacarpalphalangeal joints of front feet from five different adult steers (2-4 years) within several hours after slaughter and washed in phosphate buffered saline (PBS, Invitrogen, CA). The cartilage slices were washed in PBS supplemented with 1% penicillinestreptomycin (PBS-P/S, Invitrogen, CA), diced finely and incubated at 37° C. for a maximum of 16 h in 0.2% collagenase type II (Worthington Biochemical Corp, NJ) in Dulbecco's Minimal Essential Medium (DMEM, Invitrogen, CA) supplemented with 20% fetal bovine serum (FBS, Invitrogen, CA). The suspended chondrocytes were centrifuged three times at 1200 rpm for 10 min, and resuspended in PBS-P/S. Cell viability was greater than 96% prior to encapsulation as determined by trypan-blue exclusion test.

Polymer Preparation

PEG (3000 MW, Fluka) was dissolved in methylene chloride and reacted with excess methacryloyl chloride and triethylamine under argon for 24 h at 4° C. The reaction by-products were removed by filtration and precipitation in acetone. The final product, poly(ethylene glycol) dimethacrylate (PEGDM) was precipitated twice in cold ethyl ether and vacuum filtered to remove remaining impurities. The degree of methacrylate substitution was 80% as determined by $^1$H NMR (Varian VYR-500, CA).

Chondrocyte Encapsulation

Hydrogels were fabricated from a solution of PEGDM macromer and photoinitiator (1-[4-(2-hydroxyethoxy)-phenyl]-2-hydroxy-2-methyl-1-propane-1-one) in PBS (pH 7.4) or deionized-$H_2O$. PEGDM concentrations were varied from 10, 20 and 30% (w/w) with photoinitiator concentrations of 0.05, 0.0125, and 0.0056% (w/w), respectively. Isolated chondrocytes were suspended in the macromer/initiator solution at a concentration of $50 \times 10^6$ cells/mL and exposed to 365 nm light at approximately 2 mW/cm$^2$ for 10 min to entrap the cells within cylindrical PEG hydrogels (5 mm in diameter and 5 mm in height). Cell-laden hydrogel constructs were cultured under free swelling conditions in individual wells of a 24-well tissue culture plates containing 1.5 mL per well of chondrocyte media (10 mM N-(2-hydroxyethyl)-piperazine-N'-2-ethanesulfonic acid [HEPES], 0.1 M non-Essential Amino Acids, 0.4 mM L-proline, 50 mg/L L-ascorbic acid, 1% P/S, 10% FBS, and 0.5 mg/mL fungizone (all from Invitrogen Corp, CA) in DMEM) for 24 h prior to the application of loading.

Hydrogel Properties

Cylindrical PEG hydrogels (5 mm in height and 5 mm in diameter) without cells were swollen to equilibrium for 24 h in a PBS solution at 37° C. The swollen mass of the gel was measured. The gel was lyophilized for 24 h to determine the dry polymer mass. Equilibrium volumetric swelling ratio (Q) was determined from the equilibrium mass swelling ratio as described by Bryant et al., in *J. Orthop. Res.*, 2004, 22, 1143-9. The gel crosslinking density, $\rho_x$, was estimated from the equilibrium swelling data using a modified version of the Flory-Rehner equation neglecting chain ends. The tangent compressive modulus was determined using a mechanical tester (MTS Synergie 100, MN) in unconfined compression equipped with non-porous platens. A constant strain rate of 0.02 mm/s was applied to the hydrogels and the resulting stress was recorded. The dynamic modulus was measured in unconfined compression (Bose Force Testbench System, MN) under conditions mimicking the bioreactor. An offset strain (corresponding to the strain from the weight of the pins) was applied to the gel followed by the application of a cyclic compressive strain from 0 to 15% strain in a sinusoidal waveform at a frequency of 0.3 Hz or 1.0 Hz. The resulting stress was recorded as a function of time. The mechanical properties were measured under hydrated conditions. A sample size of 5-6 was used.

Mechanical Loading

An apparatus of the invention was used for mechanical loading, which allowed precise lifting and lowering of loading mechanism to compress the hydrogel samples with a minimum of load reflected back to the motor. The mechanism was operated near its full extended (upright) position to confer both mechanical advantage and maximum resolution of platform displacement. In this application a relatively large lateral displacement applied with a low force to the joint rod was transformed into a small vertical displacement of high force to the loading platform. Because there are no gears, the motion was very smooth and free from backlash that can often plague gear systems.

The crank radius was sized to require the stepper motor (Applied Motion Systems, WA) to sweep the better part of the full rotation to maximize the ratio of motor steps to the magnitude of sample compression. Stepper motor used had 200 full steps/revolution. This motor is driven by an electronic Gecko G212 motor driver (GeckoDrive, CA) and Galil DMC-1417 (Galil Motion Products) motion control card configured to drive at 20,000 microsteps/revolution. One full revolution of the motor produced about 1.78 mm of compression at the sample. Thus, the compound mechanism can resolve 1 micro step out of 20,000 which translates to $1/20,000 \times 1.78$ mm=0.09 µm. Practical experience in the lab indicates a repeatable accuracy of ±1 µm. Therefore, this device realized 0.1% full stroke accuracy when a sample was compressed 1 µm. In addition to micro-stepping, the Galil DMC-1417 controller card can be programmed to control waveform, strain and frequency. A Schaevitz LVDT HR 200 linear voltage displacement transformer (MSI Sensors, VA) was connected to the loading platform to verify movement distance.

A standard 24-well plate fits into the apparatus and each well was associated with a loading pin. The platens of each loading pin were fabricated from non-porous Delrin®. Each loading pin weighed approximately 5 g. The platform contained an outer acrylic casing that ensures sterile culture conditions once placed inside an incubator (Heraeus Instruments) at 37° C. and 5% $CO_2$.

After free swelling for 24 h, constructs were placed into the loading apparatus with 1.5 mL of chondrocyte media containing 1 µCi/mL of [$^3$H] thymidine and 10 µCi/mL of [$^{35}SO_4^{2-}$] (Perkin Elmer, CT) per well. The inner 12 pins were locked to the horizontal platform serving as the loaded specimen, while the remaining outer 12 pins remained free and served as the unstrained controls. The hydrogel constructs were subjected to one of three loading regimens for 48 h: (1) static 15% compressive strain, (2) 0.3 Hz at 15% amplitude strains (actual controller frequency was 0.33 Hz), and (3) 1 Hz at 15% amplitude strains (actual controller frequency was 0.98 Hz). The percent strain was based on the initial heights of the gel constructs, but the height of the gel did not change over the course of the experiment. The weight of the pins imparts an initial strain to the gels, which is dependent on the gel compressive modulus. The offset strains were 4.8, 0.7 and 0.5% for the low, medium and high crosslinked gels, respectively.

Chondrocyte Viability

Immediately post loading, cell viability was quantified in two separate gels, using a membrane integrity assay, LIVE/DEAD® (Invitrogen, CA), in which live cells fluoresce green and dead cells fluoresce red. Images (225×225 µm) were obtained using a laser scanning confocal microscope (Zeiss LSM 5 Pa) equipped with a 10× water immersion objective. Each cylindrical gel was cut into three equal horizontal sections representing the top, middle and bottom. A total of two images were taken approximately 200 µm into the gel from each section. Cell viability was quantified manually by counting live and dead cells in each image.

Chondrocyte Deformation

Gel constructs were placed in a custom designed cell strainer apparatus similar to that described by Knight et al. in *J Cell Eng.*, 1996, 1, 97-102. The cell strainer was placed on the stage of inverted microscope associated with a confocal laser scanning unit. Images were obtained for each cell at full width half maximum height under no strain and under an applied static strain. A total of three images at different focal planes with an overall average cell count of 48 cells were recorded for each gel. A total number of two gels per gel formulation were used for an n=96 for each experimental condition. Cell morphology was measured as a diameter ratio (x/y) in which x is the cell diameter parallel to the applied strain and y is the cell diameter perpendicular to the applied strain.

Biochemical Assays

After 48 h of loading, the culture medium was removed from each well and stored at −20° C. until further analysis. A total of eight constructs per condition were removed from the loading apparatuses and crushed using a tissue homogenizer followed by enzymatic digestion [125 mg/mL of papain (Worthington Biochemical, NJ), 10 mM of L-cysteine-HCl (Sigma, Mo.), 100 mM of phosphate (Sigma, Mo.) and 10 mM of ethylenediaminetetraacetic acid (EDTA) (Biorad, CA) at a pH of 6.3 for 16 h at 60° C. Hoeschst 33258 (Polysciences, PA) fluorescence assay was used to quantify total DNA content in the papain digest.

The amount of $^{35}SO_4^{-2}$ incorporation into newly synthesized PGs was determined in the papain digests using the Alcian blue precipitation method. $[^3H]$-Thymidine incorporation into newly synthesized DNA was measured in the papain digests by 10% (w/v) trichloroacetic acid precipitation. Both $^{35}SO_4^{-2}$ and $[^3H]$ thymidine from the digests were placed onto filters using the Millipore Multiscreen system (Millipore, MD). Nitrate and nitrite were measured in the media using the Colorimetric Total Nitric Oxide Assay Kit (Cayman Chemicals, MI) to determine the total NO production.

Oxygen Consumption

Gel constructs were photopolymerized directly in wells of a 96-well oxygen biosensor plate (BD Biosciences, CA). The height of the gel was 2.5 mm. Chondrocyte media (200 μL) was added to each well immediately after polymerization and incubated at 37° C. and 5% $CO_2$. Oxygen concentration was measured at the base of the well at 0 and 48 h using a fluorometer (BMG Labtech Fluostar Optima, NC). Oxygen consumption was calculated at the base of the well using the SterneVolmer equation. See, for example, *BD Biosciences Discovery Labware Technical Bulletin*, 2002, 443.

Statistical Analysis

Single factor analysis of variance (ANOVA) was performed to examine differences in NO, CP and PG synthesis in gels that were strained vs. unstrained as a function of gel crosslinking and loading condition. Statistical analyses based on a single factor ANOVA was used for analyzing the static loading experiment. An ANOVA two factor fixed effects model was used to measure the interaction between gel crosslinking and dynamic loading. A linear regression analysis was performed on the data for total NO production vs CP and on total NO production vs. PG synthesis. In all analyses, a confidence level of 0.05 was considered statistically significant.

Results

Hydrogel macroscopic properties were controlled through initial changes in the PEGDM macromer concentration prior to polymerization. Specifically, 10, 20 and 30% (w/w) PEGDM concentrations were used to create hydrogels in which the gel crosslinking density ranged from 0.110 to 0.650 mol/L. This increase in gel crosslinking resulted in a decrease in the volumetric equilibrium swelling ratio from 12.2 to 4.7 and an increase in the tangent compressive modulus from 60 to 900 kPa. The dynamic modulus increased from 70 to 1200 kPa for gels subjected to 0.3 Hz and was overall higher in gels subjected to 1 Hz, increasing from 100 to 1400 kPa.

Bovine articular chondrocytes were photo-encapsulated in PEG hydrogels in each of the three crosslinking densities and cultured as unstrained controls or subjected to one of three loading regimens for 48 h. Overall chondrocyte viability was above 70% and statistically similar for all gel compositions and culture conditions (strained or unstrained gels). In addition, no significant differences in cell viability were found as a function of depth within each hydrogel and each experimental condition. Micrographs of chondrocytes encapsulated in PEG hydrogels of each composition and either cultured as unstrained controls or subjected to 1 Hz dynamic loading conditions were taken. Similar images were obtained for gels cultured under static and 0.3 Hz loading conditions. The micrographs showed that chondrocytes were substantially uniformly distributed throughout the construct.

To study cell morphology, cell diameters and diameter ratios were measured for each crosslinked gel after 72 h of free swelling culture. Each gel composition was examined at 0% strain and under a static compressive strain mimicking the strains applied by the bioreactor. Briefly, a 15% strain plus the offset strain associated with the weight of the pin was applied to each gel. Strains of 19.8, 15.7, and 15.5% were applied for the low, medium and high crosslinked gels, respectively. In the absence of strain, cell diameters were about 12 μm and the diameter ratios were approximately unity for each gel crosslinking. Upon the application of a static strain, the cell diameter in the direction of the applied strain (x-diameter) decreased significantly while the cell diameter in the direction perpendicular to the applied strain (y-diameter) increased. For each gel crosslinking, the resulting diameter ratio decreased significantly upon the application of a static strain. In addition, diameter ratios decreased significantly with increases in the gel crosslinking (ANOVA, P<0.05).

Total NO production, CP and PG synthesis in gels subjected to static and dynamic loading were normalized to their respective unstrained control gels to isolate the effects of loading from the effects of gel crosslinking on cell response.

Under an applied static strain, total NO production was statistically similar to the unstrained controls for each crosslinked gel and was not significantly affected by changes in gel crosslinking. CP was inhibited in the low and medium crosslinked gels, but stimulated in the high crosslinked gels by 83%. PG synthesis was inhibited in gels with low crosslinking, but stimulated in gels with medium and high crosslinking by 91 and 29%, respectively.

When gel constructs were subjected to 0.3 Hz loading frequency, an increase in gel crosslinking density resulted in a significant decrease in total NO production (ANOVA, P<0.05) with an overall inhibition in PG synthesis, but no significant differences in CP. In the low crosslinked gel, an increase in loading frequency from 0.3 to 1 Hz resulted in an increase in total NO production, a decrease in CP, but no effect on PG synthesis. Similar trends were observed for the medium crosslinked gel, but PG synthesis was significantly reduced with higher loading frequency. In the high crosslinked gels an increase in loading frequencies did not have a significant effect on total NO production or CP, but resulted in a significant increase in PG synthesis. A significant interaction between gel crosslinking density and loading frequency led to varied responses in total NO production, CP and PG synthesis (P<0.001, P<0.001, P<0.001, respectively).

Oxygen consumption was measured as a function of crosslinking density at a distance (2.5 mm) that represented the middle of the gel constructs. The data showed that oxygen consumption decreased by 88% after 48 h of free swelling culture. There were no significant differences in oxygen consumption as a function of gel crosslinking.

A linear regression statistical analysis was performed to determine if correlations exist between total NO production and CP or between total NO production and PG synthesis under mechanical loading. Under an applied static strain, there was a positive correlation between total NO production and CP ($R=0.5$; $P<0.05$) but no significant correlation was found between total NO production and PG synthesis ($R=0.1$; $P=0.67$). No significant correlations were found for the dynamic loading conditions. However, when examining each dynamic loading frequency separately, a positive correlation was found between NO and CP ($R=0.54$; $P<0.01$) and NO and PG synthesis ($R=0.73$; $P<0.01$) at 0.3 Hz. No correlations between total NO production and CP or PG synthesis were found at 1 Hz.

Discussion

Neutral crosslinked PEG hydrogels of different crosslinking densities were fabricated as a 3D model system to study chondrocyte response due to changes in cell deformation. When a static strain was applied to PEG constructs of different crosslinking densities, an increase in the gel crosslinking led to an increase in cell deformation. Without being bound by any theory, this result is believed to be due to the macroscopic heterogeneities that form in the network structure during polymerization where the degree of heterogeneity increases with higher crosslinking densities. Three crosslinking densities of gels with a range of water contents and mechanical properties without sacrificing cell viability were examined. The high crosslinked gel imbibes 82% water, had a tangent compressive modulus of about 900 kPa, and had a dynamic modulus in the range of 1200–1400 kPa depending on the loading frequency. In addition, the chemically crosslinked nature of the PEGgels resulted in little stress relaxation under a constant strain. This result indicates that deformation of the encapsulated cells closely follow the applied gross strain enabling efficient transfer of the applied strain from the construct to the cells during each cycle. In general, an increase in the gel crosslinking density resulted in a significant increase in the degree of cell deformation even though the applied strain was highest in gels with lowest crosslinking (ANOVA, $P<0.05$).

When a gross static strain was applied to PEG hydrogels, a continuous strain was imparted on the encapsulated chondrocytes, which depends on the crosslinking density. It appeared that static loading did not significantly influence total NO production. However, in the low crosslinked gels, static loading inhibited CP and PG synthesis. In gels with medium crosslinking, matrix production was significantly enhanced by static loading and to a lesser degree in the high crosslinked gels. One key difference between the low crosslinked gel and the medium or high crosslinked gel was the diffusional properties of newly synthesized matrix molecules. The gel structure in the low crosslinked gels was sufficiently large to enable PG molecules to diffuse throughout the gel. In contrast, the structure of the medium and high crosslinked gels restricted matrix diffusion causing localization of newly synthesized matrix to remain in the pericellular region. Although limited matrix was produced during early culture times, localized PG molecules in the pericellular regions is believed to have led to differences in the ionic and osmotic environment surrounding the cells which was further enhanced under static loading as fluid was expressed from the gel. It has been shown that static loading applied to cartilage explants leads to increased PG synthesis in the pericellular matrix, although overall PG synthesis decreased in the explant when compared to free swelling controls. Therefore, without being bound by any theory, it is believed that this difference in localization of PGs in the pericellular regions as a result of the gel crosslinked structure provided additional outside-in signals to the entrapped cells to affect matrix production. CP was also enhanced in gels with high crosslinking densities under static load. It is also believed that this pericellular environment also influence pathways involved in CP.

It is believed that dynamic loading produces a significantly more complex environment involving both cell deformation and fluid flow, which influences cell response within the PEG hydrogels. While the degree of cell deformation varies with crosslinking density, the total number of cycles, and therefore the total number of times the cells deform, vary with frequency. In addition, induced fluid flow through the gels is believed to be dependent on a combination of factors including crosslinking density and frequency. It is believed that the PEG crosslinks provide the structural support of the hydrogel similar to the crosslinks formed between the collagen fibers in native cartilage.

Under some conditions dynamic loading of PEG constructs had either no significant effect or an inhibitory effect on total NO production, CP, and PG synthesis. Results from the dynamic loading studies generally demonstrated that an increase in gel crosslinking (corresponding to an increase in cell deformation) leads to decreases in total NO production and decreases and/or inhibition in CP and PG synthesis. In addition, an increase in the loading frequency generally led to higher total NO productions but lower CP and PG synthesis. However, an increase in loading frequency from 0.3 to 1 Hz resulted in increased PG synthesis. Without being bound by any theory, it is believed that changes in the cell environment (due to localization of newly synthesized molecules and/or higher cell deformations) led to this up-regulation in PG production.

A combination of cell deformation (through increases in gel crosslinking) and certain mechanical loading conditions (static and/or 0.3 Hz) led to statistically significant positive correlations between total NO production and CP and between total NO production and PG synthesis. It is believed that the high cell concentrations used led to a hypoxic environment within the PEG hydrogels, and therefore in the absence of oxygen, total NO production exhibited a positive correlation with chondrocyte response. The present inventors have shown that oxygen concentration decreased by about 88% at the center of the construct for all three crosslinked gels. Although there may be an oxygen concentration gradient radially in the construct, this finding showed that a significant portion of the hydrogel construct was hypoxic. A similar reduction in oxygen tension was found when comparable cell concentrations were employed in agarose constructs. It is possible that dynamic loading, in the case of 0.3 Hz, decreased total NO production and in the absence of oxygen led to decreased matrix production.

Changes in gel crosslinking densities led to changes in cell deformation. However, the combined effects of loading and gel crosslinking on chondrocyte response were believed to be more involved than simple changes in cell deformation. Although PEG is a neutral hydrogel, early synthesis of ECM molecules may influence cellular responses due to an osmotic and/or ionic environment, which is likely to be dependent on the crosslinked structure. A positive correlation was observed between NO and CP and between NO and PG synthesis under certain mechanical loading conditions suggesting a potential pathway involved in chondrocyte mechanotransduction. Since cartilage is an avascular tissue, chondrocytes within cartilage are in a hypoxic environment under normal physiological conditions. Therefore, PEG hydrogels seeded with a high cell concentration emulate a hypoxic environment and may provide a 3D model with which to study chondrocyte mechanotransduction pathways under hypoxia.

Example 2

Hydrogel Formation

Poly(ethylene glycol) (PEG, 3000 Da, Fluka) was reacted with methacryloyl chloride (Sigma) or acryloyl chloride (Sigma) in the presence of triethylamine (Sigma) for 24 hrs at 4° C. The final PEG macromer product, poly(ethylene glycol) dimethacrylate (PEGDM) or polyethylene glycol diacrylate (PEGDA), was purified by precipitations in ethyl ether and analyzed using $^1$H NMR (Varian YVR-5005). The degree of substitution was greater than 80%. To create cylindrical gels (5 mm×5 mm), PEGDM was dissolved in phosphate buffered saline (PBS, pH 7.4, Invitrogen) at 10, 20 or 30% (w/w) and mixed with 0.05, 0.0125, or 0.0056% (w/w) photoinitiator (Irgacure I2959, Ciba Specialty Chemical), respectively, and exposed to 365 nm light (UVP, Model XX-20) at 6 mW/cm$^2$ for 10 minutes to form low, medium and high crosslinked gels, respectively.

To study the role of cell-matrix interactions in the form of mechanoreceptors, the cell adhesion ligand, RGD, was incorporated into the PEG hydrogel network. In brief, a 10% molar excess of NH$_2$-Tyr-Arg-Gly-Asp-Ser-COOH (YRGDS, Bachem) (1 mg/ml) was reacted with acryloyl-PEG-N-hydroxysuccinimide (ACR-PEG-NHS) (3400 Da, Nektar) (10 mg/ml) in 50 mM of bicarbonate buffer (pH=8.4) for 2 hours. A fluoraldehyde assay (Pierce) was used to assess indirectly the efficiency of the reaction by measuring the amount of unreacted primary amines, which was determined to be greater than 85%. The final product, ACR-PEG-RGD was dialyzed overnight and lyophilized for 24 hours. ACR-PEG-RGD (0, 0.1, 0.4, and 0.8 mM) was added to 10% w/w PEGDA with 0.05% w/w Irgacure 2959 and polymerized as described above.

Cell Isolation and Culture

Chondrocytes were isolated from full depth articular cartilage harvested from the patellar-femoral groove of 1-3 week old calves (Research 87) or from the metacarpalphalangeal joints of front feet from 2-4 year old steers (Arapahoe Packing) within 24 hours of slaughter. Explanted cartilage was digested in 500 units/mL collagenase II (Worthington Biochemical) in Dulbecco's minimal essential medium (DMEM, Invitrogen) supplemented with 5% fetal bovine serum (FBS, Invitrogen) for 16 hours at 37° C. Isolated chondrocytes were washed and resuspended in chondrocyte media (DMEM supplemented with 20% FBS (v/v), 0.04 mM L-proline (Sigma), 50 mg/L L-ascorbic acid (Sigma), 10 mM HEPES buffer (Invitrogen), 0.1 M MEM-nonessential amino acids (Invitrogen), 1% penicillin-streptomycin (Invitrogen), 0.5 μg/mL fungizone (Invitrogen), and 20 μg/mL gentamicin (Invitrogen)). Chondrocytes at 50 million cells/mL were combined with sterile macromer solution and photopolymerized as described above. Cell-laden hydrogel constructs were allowed to equilibrate under free swelling conditions for 24 hrs in cell culture media in a humid environment at 37° C. and 5% CO$_2$ prior to loading mechanically.

In some experiments, a live cell encapsulated in a low crosslinked PEG hydrogel were subjected to no strain and some were subjected to a 15% strain. Cell deformation was quantified by a diameter ratio as a function of gel crosslinking under no strain and subjected to an applied 15% strain. The macroscopic properties (i.e., equilibrium water content (%) and compressive modulus (kPa)) of the gels are also determined as a function of gel crosslinking.

In other experiments, a live cell was surrounded by a newly synthesized pericellular matrix three days post-encapsulation in a low crosslinked PEG hydrogel. The effects of hydrogel structure in the form of crosslinking density and culture time on anabolic and catabolic gene expression was determined. Anabolic gene expression was measured by collagen type II and aggrecan. Catabolic gene expression was measured by MMP-1 and MMP-3. The data were normalized to day 0 expression levels.

The effects of dynamic loading regime on chondrocyte anabolic and catabolic activity within a low crosslinked PEG gel was determined. Two loading regimes were examined: continuous dynamic loading at 0.3 Hz and 15% amplitude strains and intermittent dynamic loading at 0.3 Hz and 15% amplitude strains (12 hrs off, 1 hr on/1 hr off for 12 hrs). Gene expression was normalized to day 0 time point (i.e., 24 hours post-encapsulation and immediately prior to loading). Anabolic gene expression and catabolic gene expression were measured.

It is believed that in PEG-RGD gels, the RGD ligand binds to its corresponding integrin on the cell membrane. When a compressive strain was applied to the PEG-RGD constructs, the RGD ligand-integrin bond is believed to act as a mechanoreceptor to regulate chondrocyte function. Chondrocyte response was measured by newly synthesized matrix, e.g., total collagen production and glycosaminoglycan production, in the absence of loading and when subjected to dynamic loading (0.3 Hz, 15% amplitude strains).

Cell and Matrix Visualization

To visualize chondrocytes encapsulated into hydrogels or seeded onto porous hydrogels, a fluorescent membrane integrity assay, LIVE/DEAD® Assay (Invitrogen) where live cells fluoresce green and dead cells fluoresce red was employed. Hydrogels were treated with 5 μM calcein-AM and 2 μM ethidium homodimer for 30 minutes. For matrix visualization in situ, an immunofluorescent approach was employed. The hydrogels were placed in PBS supplemented with 0.5 Units/mL Chondroitinase ABC (Sigma) and 1% BSA (Sigma) to expose the chondroitin sulfate epitope for 1 hour. Hydrogels were treated with anti-chondroitin-6-sulfate (clone MK-302, Chemicon) (1:50) in DMEM+20% FBS for 1 hour, rinsed with Earle's Balanced Salt Solution (EBSS, Gibco), and placed in DMEM+20% FBS with goat anti-mouse IgG labeled with Alexa Fluor 546 (1:20) (Invitrogen) for 1 hour. Cytoplasm was counterstained with 5 μM calcein-AM for 30 min.

Cell Deformation

Chondrocyte-laden hydrogel constructs were allowed to swell for 72 hours prior to placing in a hydrogel strainer apparatus. The hydrogel strainer sits on the stage of an inverted microscope associated with a confocal laser scanning unit (Zeiss LSM 510). Hydrogels were subjected to 15% compressive strain. Images were captured at full width half maximum height immediately after the application of the applied strain. The level of cellular strain remained constant during the experiment (~1 hr, unpublished results). A total of 48 cells were imaged from three regions of interest per hydrogel composition (2 gels were imaged per formulation, n=96). Cell morphology was quantified by a diameter ratio (x/y) where x represents the cell diameter parallel to the applied strain and y represents the cell diameter perpendicular to the applied strain.

Mechanical Loading

Loading apparatuses of the invention were employed to apply dynamic compressive strains to the cell-laden hydrogel constructs. Briefly, each loading apparatus uses a standard 24-well tissue culture plate in which one gel is placed in each well and has a corresponding loading platen. Frequency, strain and duration are readily controlled by an external computer. The low crosslinked gels were employed in the dynamically loaded experiment. Due to the weight of the platen, a 5% offset strain was applied to the hydrogel. Dynamic loading was performed by applying a sinusoidal waveform from 5 to 20% maximum strain with a frequency of 0.3 Hz. In some instances, the gels were dynamically loaded for 1 and 7 days either continuously or intermittently (12 hrs off, 1 hr on/1 hr off for 12 hrs). In other instances, the gels were dynamically loaded for 2 days continuously. At specified time points, samples were removed. Chondrocyte media was replaced every two days. Free swelling gels were cultured in 24 well culture plates and used as unstrained controls. Cell viability was qualitatively assessed using a LIVE/DEAD® Assay (Invitrogen) and was high under all conditions.

Gene Expression

At specific time points, loaded or unloaded gels were removed and immediately homogenized under liquid nitrogen and subsequently processed with TRI Reagent (Sigma) to isolate total RNA. RNA was quantified using Ribogreen RNA Quantification Kit (Invitrogen) or the Nanodrop (ND-1000, Thermo-Fisher). RNA (100 ng to 1 µg) was treated with Turbo DNA-free (Ambion) and transcribed using the High Capacity cDNA Kit (Applied Biosystems). Real-time RT-PCR (ABI 7500Fast) was performed and validated D-LUX primers for L30, collagen II, aggrecan, MMP-1, and MMP-3 with the Taqman® Fast Universal PCR Master Mix (Applied Biosystems). For MMP-1, an amplicon length of 68 base pairs was produced. For MMP-3, an amplicon length of 67 base pairs was produced. Data are presented as:

$$\text{Normalized Expression} = \frac{E_{(GOI)}^{\Delta C_{T(GOI)}(calibrator-sample)}}{E_{(HKG)}^{\Delta C_{T(HKG)}(calibrator-sample)}}$$

where E is the efficiency of the gene amplification, GOI is the gene of interest, HKG is the housekeeping gene (L30), and CT is the cycle threshold point. The samples were normalized to a calibrator (e.g., day 0 samples). L30, a mitochondrial ribosomal protein, was used as the HKG because it was stable throughout the experiments. A sample size of 3 was used.

Biochemical Analysis

At specified time points, gels were removed, homogenized and digested in a papain enzymatic solution [125 mg/mL of papain (Worthington Biochemical), 10 mM of L-cysteine-HCl (Sigma), 100 mM of phosphate (Sigma) and 10 mM of ethylenediaminetetraacetic acid (Biorad) at a pH of 6.3 for 16 h at 60° C. Hydroxyproline was measured as an indication of the total collagen content in the digests. Glycosaminoglycan content was measured in the papain digests using the dimethylmethylene blue dye (Sigma) method. Hoeschst 33258 fluorescence assay (Polysciences) was used to quantify total DNA content in the papain digest. All biochemical data were normalized to total DNA content. A sample size of 3 was used.

Hydrogel Characterization

Cell-free cylindrical hydrogels (5 mm×5 mm) were swollen for 24 h to equilibrium in PBS at 37° C. To measure the equilibrium water content, the equilibrium swollen mass was measured. The gel was subsequently dried by lyophilization for 24 hours and the dry polymer mass measured. The tangent compressive modulus (MTS Synergie 100) was determined by applying a constant strain rate of 0.02 mm/s to the hydrated hydrogels in unconfined compression and the resulting stress recorded. A sample size of 5-6 was used for gel characterization.

Statistical Analysis

Data are represented as mean±standard deviation. Normalized gene expression values were analyzed using ANOVA and Tukey post-hoc to determine the statistical significance. A confidence level of 0.05 was considered significant.

Results and Discussion

The Role of Hydrogel Structure in Regulating Cell Deformation

Cell deformation is thought to be one mechanism by which chondrocytes sense mechanical loads. Chondrocytes were encapsulated in PEG hydrogels of three crosslinking densities (i.e., low, medium and high) and cultured under free swelling conditions for 3 days. At day 3, the gels were subjected to a 15% compressive strain and their morphology assessed. Images of a chondrocyte encapsulated in the low crosslinked PEG hydrogel and subjected to no strain and a gross 15% compressive strain were prepared for analysis. Cell deformation was quantitatively assessed by a diameter ratio where a value of one indicates a spherical cell and a value less than one indicates the cell has deformed cell under the applied gross strains. In the absence of an applied strain, the diameter ratios were unity for all gel crosslinking densities indicating the encapsulated cells adopted a round morphology. However, the application of a compressive strain resulted in a significant decrease in the diameter ratio in all three gels. The level of cell deformation was dependent on the degree of crosslinking and was highest in gels with the highest crosslinking density. The hydrogel macroscopic properties were also evaluated in which the water contents were greater than 80% in all gels, while the compressive moduli spanned from 60 to 900 kPa. These data suggest that synthetic crosslinked hydrogels offer a mechanism to control the level of cell deformation through changes in the crosslinking density.

The Role of Hydrogel Structure in Regulating Chondrocyte Activity

In cartilage homeostasis, chondrocytes are responsible for turnover of new matrix where there is a balance between anabolic and catabolic activities. Elucidating these activities as a function of scaffold and culture environment is useful in designing a scaffold to promote new tissue growth. In the absence of an applied load, the hydrogel structure may influence chondrocyte activity due to the crosslinks. It has been shown that the crosslinking density of PEG gels influences the distribution of newly synthesized matrix where gels with high crosslinking restrict diffusion of matrix molecules into the extracellular regions of the gel.

Within several days post-encapsulation chondrocyte anabolic activity involves depositing a pericellular matrix. Images of a live chondrocyte after being encapsulated in a low crosslinked gel for 3 days were taken. The cell was surrounded by newly synthesized matrix. It is believed that the formation of this pericellular matrix is an innate response of the chondrocyte when placed in a new environment. To assess anabolic and catabolic chondrocyte activities as a function of gel crosslinking, free swelling hydrogels of two different crosslinking densities were examined. The low and medium crosslinked gels were examined. Gene regulation of two major extracellular matrix (ECM) proteins, collagen II and aggrecan, was assessed for anabolic activity. Gene regulation for catabolic activity was assessed by measuring matrix metalloproteinases (MMP). MMP-1, which is responsible for cleaving collagen (including collagen II) and MMP-3, which is responsible for cleaving aggrecan, were examined.

Gene expression was normalized to day 0 expression and followed over a 20 day culture period. Collagen II expression increased slightly in the low crosslinked gel up to day 10, but by day 20, expression levels were similar to day 0. A decrease in collagen II expression, however, was observed with the medium crosslinked gel with culture time. Aggrecan expression for the low crosslinked gels significantly increased with culture time up to day 10 but by day 20 was statistically similar to day 0. For the medium crosslinked gel, aggrecan expression did not significantly change with culture time, but was statistically lower compared to the low crosslinked gel at days 5 and 10. Overall, catabolic activities were significantly down regulated within 5 days of culture by 10-fold for MMP-1 and 100 to 1000-fold for MMP-3 regardless of gel crosslinking. These results indicate that free swelling PEG hydrogels support anabolic gene expression, with the highest expression levels seen in the low crosslinked gel, and inhibits catabolic activities.

The Role of Dynamic Loading Regime in Regulating Chondrocyte Activity

Mechanical loading plays an integral role in cartilage homeostasis but the optimal conditions for in vitro culture is believed to be dependent on the scaffold architecture and its chemistry. The low crosslinked gel was utilized because of its role in enhanced anabolic activities to explore two loading regimes. Specifically, a continuous and intermittent dynamic loading regime was chosen to understand the importance of loading duration on chondrocyte activity during early culture times of up to one week. Dynamic compressive strains were applied for one week continuously or intermittently (12 hrs off, 1 hr on/1 hr off for 12 hrs). During each loading cycle the cell will undergo deformation in which cells cultured under the continuous loading regime will experience 4 times more cycles (and deformations) compared to the intermittent regime. Early chondrocyte response was assessed by measuring anabolic and catabolic gene expression at day 0 (i.e., 24 hours post-encapsulation), day 1, and day 7. Gene expression was normalized to day 0 time point.

Gels cultured under continuous dynamic loading conditions led to an up-regulation in anabolic activities (e.g., aggrecan) and a down regulation in catabolic activities. By day 7, a 3-fold increase in aggrecan expression, 5-fold decrease in MMP-1 expression, and 10-fold decrease in MMP-3 expression were observed. When gels were subjected to intermittent loading conditions, chondrocytes behaved much differently. By day 7, collagen II and aggrecan expression were up-regulated by about 2-fold; however, MMP-1 and MMP-3 levels increased by approximately 180-fold and 7-fold, respectively.

These results show that continuous dynamic loading moderately stimulates anabolic activity, but down regulates catabolic activity while intermittent dynamic loading leads to a moderate stimulation of anabolic activity but a significant up-regulation in catabolic activities. These results are surprising and unexpected as others have suggested that intermittent loading is desirable for tissue deposition while continuous loading may be interpreted as overloading and negatively impact tissue growth. During the off period in the intermittent loading regime, the gels are subject to the weight of the loading platen, which for the low crosslinked gels, inherently causes a ~5% strain on the gels. Static strains have been shown to increase MMP activity in cartilage explants and in chondrocyte seeded scaffolds. However, an integral part of the remodeling process of the ECM is the initial breakdown of matrix following reorganization and synthesis of new matrix. Therefore, it is believed that stimulation of both anabolic and catabolic activities is useful in improving overall tissue formation.

The Role of Mechanoreceptors in Regulating Chondrocyte Activity

The ECM of cartilage is comprised predominantly of collagen II and aggrecan. However, chondrocytes are surrounded by a very different matrix called the pericellular matrix (PCM), which is rich in collagen types II, VI, IX, fibronectin and aggrecan. Cellular interactions with the "information rich" PCM result in "outside-in" signaling mechanisms, which regulate many biological processes such as cell growth, differentiation and overall tissue maintenance. Fibronectin, one of the proteins found in the PCM, binds to cell surface receptors through the short oligopeptide sequence, Arg-Gly-Asp (RGD). The RGD sequence has been shown to be essential for chondrocyte adhesion to fibronectin coated surfaces and has been shown to enhance chondrogenesis of human mesenchymal stems when encapsulated in PEG hydrogels.

A study was conducted to determine if RGD can act as a mechanoreceptor and its biomechanical role in regulating chondrocyte function and tissue deposition. Specifically, RGD was tethered to a low crosslinked PEG hydrogel by incorporating varying initial concentrations of an acryolyl modified RGD (0, 0.1, 0.4 and 0.8 mM). The incorporation of RGD did not significantly affect the mechanical properties (e.g., compressive modulus) or the water content of the hydrogels. When subjected to an applied compressive strain, the integrin-ligand interaction may also undergo strain and serve as a mechanical transducer. In order to elucidate concentration effects of RGD, chondrocyte response was studied at very early culture times of up to 3 days (1 day of free swelling culture and 2 days of loading) to minimize the cell-matrix interaction that result from newly synthesized matrix.

The role of RGD on matrix production in the absence of mechanical loading was also examined. To isolate the effects of RGD, PEG-RGD gels were normalized to PEG gels which did not contain RGD. Newly synthesized matrix molecules were analyzed by measuring total collagen and glycosaminoglycan contents. The incorporation of RGD into the hydrogels had a little effect on matrix production. There was no significant affect on collagen production at the RGD concentrations studied. A down regulation in GAG production was observed in the 0.4 mM RGD gels, but reached similar values with 0.8 mM RGD. To study the effects of RGD as a mechanoreceptor, dynamically loaded PEG-RGD gels were normalized to loaded PEG gels which did not contain RGD. The addition of 0.1 mM RGD resulted in a significant inhibition in total collagen production, but this inhibition was fully recovered with higher amounts of RGD. On the contrary, GAG production was not affected by the addition of low amounts of RGD, but 0.8 mM RGD resulted in a 3-fold increase in GAG production. These results indicate that RGD can act as a mechanoreceptor to inhibit collagen production (at low RGD concentrations), but stimulates GAG synthesis (at higher RGD concentrations).

Example 3

Materials and Methods

Poly(ethylene glycol) dimethacrylate (PEGDM) macromer was dissolved at 10% or 20% (w/w) in phosphate buffer saline. Gels were formed via photopolymerization under 365 nm light at ~6 mW/cm$^2$ for 10 min using ≦0.05% (w/w) photoinitiator (12959, Ciba Specialty Chemical) or via redox initiation using 0.05 M ammonium persulfate (Sigma)

and 0.05 M TEMED (Sigma) at room temperature for 15 min. Chondroitin sulfate (ChS) (50 mg, MW ~32 kDa, Sigma) or fluoresceinamine-labeled hyaluronic acid (f-HA) (1 mg, MW 130 kDa, Lifecore Biomedical) was dissolved per g macromer solution prior to polymerization.

Cylindrical constructs (5×5 mm) were rinsed and immediately placed in a mechanical testing device (Testbench, BOSE or a custom mechanical loading machine2) submerged in 2 mL of water per construct. Constructs were subjected to unconfined, dynamic 15% compressive strains at 1 Hz and compared to samples run under free-swelling conditions. Release of ChS was measured using a modified dimethylmethylene blue assay while release of f-HA was quantified by fluorescence (495 nm excitation/520 nm emission) with known standards.

A peptide based on cartilage link protein (DHLSDNY-TLDHDRAIH) was synthesized (Applied Biosystem 433A Peptide Synthesizer) following standard protocols, purified by HPLC, and confirmed by MALDI-TOF mass spectrometry. The peptide was coupled to monoacryloyl PEG-NHS (MW 3400, Nektar Therapeutics) and purified in ether. Gels were fabricated as before but with the addition of this monacryloyl PEG-peptide linkage (1 mg/ml macromer). Data is presented as % release as a function of time where mass of ECM released is normalized to the initial amount loaded into each gel. Data is analyzed by ANOVA with a significance level of a=0.05.

Results and Discussion

Two hydrogels were fabricated by varying the macromer concentration in solution prior to polymerization to create hydrogels with a low and high crosslinked structure. The release of chondroitin sulfate was dependent on the degree of gel crosslinking where a higher crosslinked gel led to slower release times. Nonetheless, release of chondroitin sulfate reached almost 100% in both crosslinked gels by 24 hours under free swelling (FS) conditions. When subjected to dynamic loading, ChS release was hindered significantly ($p<0.01$, at 120 mins) in the higher crosslinked gels whereas no significant difference was observed in the lower crosslinked gels. This may be due to a decrease in the apparent gel porosity which occurs from the application of a compressive strain.

The release of hyaluronic acid (HA), a larger ECM molecule, was also examined in the absence and presence of loading. In both crosslinked gels, dynamic loading increased the rate of release of HA from the gels. However, after 6 days of culture, complete release was not observed. Based on this finding, the HA binding domain of link protein, a short 16-mer oligopeptide, was incorporated into the PEG gels as a tethered moiety. In the lower crosslinked gels, the presence of the peptide significantly decreased HA release under dynamic loading ($p<0.01$), decreasing HA release by 60% after 6 days of loading. However, no significant differences were observed in the higher crosslinked gels.

Structural changes in the gel, ECM chemistry, and convective transport contribute to the release of cartilaginous components from the PEG hydrogel. In the highly swollen gels (e.g., 10% pegdm gels), dynamic loading-induced fluid flow enhanced the transport of larger molecular weight species, increasing the release of HA, whereas lower MW ChS was unaffected. When crosslinking density increased (e.g., 20% pegdm gels), ECM diffusion was reduced, as expected due to the lower mesh size, but was furthered reduced by dynamic strain. This observation showed that reduced porosity during mechanical loading has a greater effect on ECM transport compared to loading enhanced fluid transport. Surprisingly, the release of HA increased under loading in the higher crosslinked gels, although the overall % release was <10%.

Example 4

Materials and Methods

Macromers

Triblock copolymers poly(lactic acid)-b-poly(ethylene glycol)-b-poly(lactic acid) with methacrylate end groups (PLA-b-PEG-b-PLA-DM) were synthesized using PEG with molecular weight (MW) 3000 g/mol (Fluka). Macromers were purified by repeated precipitations in ethyl ether. The number of lactic acid units and degree of methacrylate functionalization were determined by $^1$H-NMR and are reported in Table I for the two macromers used in this study.

TABLE I

Hydrogel formulation

| Degree of Crosslinking | Macromer (PLA-b-PEG-b-PLA-DM)[a] | | |
|---|---|---|---|
| | Lactide Units[b] | Degree of Methacrylation[c] | Macromer % (w/w)[d] |
| Low | 4 | 0.78 | 10 |
| High | 5 | 0.65 | 20 |

[a]Poly(lactic acid)-b-poly(ethylene glycol)-b-poly(lactic acid) dimethacrylate
[b]Average number of lactic acid units per side of PEG determined by 1H-NMR.
[c]Defined as the fraction of PLA-PEG-PLA functionalized with two methacrylates as determined by $^1$H-NMR. A degree of 1.0 indicates that all PLA-PEG-PLA molecules are dimethacrylated.
[d]Macromer concentrations prior to photopolymerization.

Hydrogel Formation

PLA-b-PEG-b-PLA-DM was dissolved in phosphate buffered saline (PBS) to final concentrations of 10% or 20% (w/w). The photoinitiator Irgacure 2959 (1-[4-(2-hydroxy-ethoxy)-phenyl]-2-hydroxy-2-methyl-1-propane-1-one) (Ciba Specialty Chemicals) was added at 0.05 or 0.0125% (w/w), respectively. Macromer solutions were filter-sterilized with 0.22 μm syringe filters. Photopolymerized cylindrical constructs (5 mm×5 mm) were created by photopolymerization using 365 nm light (UVP, model XX-20) at an intensity of ~6 mW/cm$^2$ for 10 minutes.

Mechanical Loading

A loading apparatus of the invention was used which fits into a standard incubator (37° C. and 5% $CO_2$) and holds 24 samples within a standard 24-well tissue culture plate. Twelve of the samples were subjected to dynamic loading by individual platens connected to a single loading arm and the remaining 12 samples were unloaded controls where the platen simply rests on the sample. The loading mechanism of the bioreactor was open-loop controlled and applies axial displacement with a resolution of 1 micron. A computer was connected to the bioreactor allowing the user to program displacement, frequency, and waveform. The bioreactor was equipped with a linear variable displacement transducer (LVDT), which allows for real-time displacement measurements. The LVDT measurements agreed well with the target displacement parameters for all gels studied here indicating that the bioreactor had no detectable compliance. Two types of platens, impermeable and permeable, were employed of similar size and shape. Impermeable platens were made of Delrin® and imparted 51 mN of force upon each gel prior to dynamic loading. Permeable platens were made of Porex® HDPE (40-70 μm) and imparted 27 mN of force upon each gel prior to dynamic loading. With the permeable platens, a 2 mm thick porous disc was placed under the sample. Additional samples were incubated under free-swelling conditions. All dynamic loading regimes were performed continuously with a 15% amplitude strain applied in a sinusoidal waveform at frequencies of 0.3, 1, or 3 Hz. It is also important to note that because of the predominantly elastic nature of these PEG hydrogels, lift-off associated with dynamic loading was not observed at the strains and frequencies studied. Gels were degraded in 2.0 mL of chondrocyte culture medium (DMEM supplemented with 20% FBS (v/v), 0.04 mM L-proline, 50 mg/L L-ascorbic acid, 10 mM HEPES buffer, 0.1 M MEM-nonessential amino acids, 1% penicillin-streptomycin, 0.5 μg/mL fungizone, and 20 μg/mL gentamicin (all purchased from Invitrogen)), which was replaced every 2-3 days.

Hydrogel Degradation Characterization

Each hydrogel construct was immediately weighed post-polymerization ($m_i$). The initial polymer mass ($m_{pi}$) was calculated by multiplying the initial mass of the hydrogel ($m_i$) by the weight fraction of macromer in the polymerizing solution (i.e., 10% or 20% w/w). At specified time points during degradation, constructs were removed from the culture medium and weighed to determine the swollen mass ($m_{ps}$). The gels were then lyophilized for 48 hours and their dry polymer mass ($m_p$) determined. The percent mass loss was determined for each time point by:

$$\text{Mass loss} = \left(\frac{m_{pi} - m_p}{m_{pi}}\right) \times 100\% \quad (1)$$

The volumetric swelling ratio, Q, was calculated from the equilibrium mass swelling ratio ($m_{ps}/m_p$) and the densities of the polymer ($\rho_p$) and solvent ($\rho_s$) by:

$$Q = 1 + \frac{\rho_p}{\rho_s}\left(\frac{m_{ps}}{m_p} - 1\right) \quad (2)$$

At specified time points during degradation, constructs were removed from culture media and their tangent modulus determined (Bose TestBench 10N) by applying a constant strain rate under unconfined compression (0.1 mm/min). The cross-sectional area of the gels was assumed constant as a function of time.

Statistical Analysis

All values are reported as mean±standard error (n=3). Significance at the 95% confidence level was determined for swelling ratio curves using an unpaired student t-test with a sample size of six to twelve time points. For swelling (Q) versus time plots, the natural log of the data was fit by a linear regression model using GraphPad Prism version 5.0 for Macintosh computer (GraphPad Software). The k' values were determined from the slope and the mean values are reported with $R^2$ values. Two-way ANOVA was performed using Tukey post-hoc analysis for the data presented in Table 5 where the factors were crosslinking density and loading. For all comparisons, a 95% confidence level was considered significant.

Results and Discussion

This experiment examined inter alia the overall degradation behavior and degradation kinetics of PLA-b-PEG-b-PLA hydrogels when subjected to mechanical stimulation. Degradation was characterized by changes in mass loss, swelling ratios, and compressive modulus as a function of time. In general for mass loss to occur, an ester bond on each side of the crosslinker needs to be cleaved and eroded from the gel. Initially, the release of smaller molecules, including PEG crosslinks and mono- and oligomeric lactic acid, occurs. As degradation continues, the larger poly(methyl methacrylate) kinetic chains are released. Eventually, the gel reaches a point where there are no longer a sufficient number of crosslinks to maintain a solid network, and the resulting highly branched polymer dissolves (referred to as reverse gelation point). For changes in swelling to occur, cleavage of only one side of the crosslink need to occur.

To assess degradation kinetics, the volumetric equilibrium swelling ratio (Q) of highly swollen PLA-b-PEG-b-PLA hydrogels has been shown to scale with degradation time by the following relationship:

$$Q \sim e^{(6/5)k't} \quad (3)$$

where k' is the pseudo first order rate constant (days$^{-1}$), and t is degradation time (days). The bulk degradation behavior of PLA-b-PEG-b-PLA hydrogels has been shown to follow pseudo first order degradation kinetics. The pseudo first order rate constant k' accounts for the rate constant associated with cleavage of the ester bond in the PLA segment and concentrations of water and hydronium ions. Because these are highly swollen networks, the water and ion concentrations are assumed constant throughout the degradation. Therefore, k' provides insight into the degradation kinetics of these hydrogels.

Two different PLA-b-PEG-b-PLA-DM macromer formulations were used to produce gels that exhibited initially different gel crosslinking densities. In general, a higher crosslinked gel led to slower degradation times. It is believed that the dominant factor that influences gel crosslinking is the macromer concentration in solution prior to polymerization. This experiment was performed in cell culture medium containing serum, which has been shown to significantly enhance degradation of the PLA-b-PEG-b-PLA hydrogels compared to buffered saline solution. Cell culture medium enabled assessment of degradation in a more relevant medium.

To ensure that the two formulations resulted in different degradation profiles, mass loss and swelling were assessed as a function of degradation time for free swelling conditions. The gels formed from both formulations exhibited characteristic mass loss profiles. Mass loss was similar for both formulations up to 6 days and ~50% mass loss at which time degradation was significantly slower in gels with initially higher crosslinking (p<0.01). The overall degradation time was 8 days for the low crosslinked gel and 10 days for the high crosslinked gel.

Volumetric equilibrium swelling ratios were determined as a function of degradation time. Q was observed to change exponentially with degradation time as expected. At early time points, Q was significantly lower in the gel with an initially higher gel crosslinking (p<0.05). For example, at day 2, Q was 12.5 for the low crosslinked gel, but 7.2 for the high crosslinked gel. The pseudo first-order rate constants for each formulation were determined which indicated a significantly faster degradation rate associated with the lower crosslinked gel (p<0.05).

This data illustrates that two formulations led to gels with different initial gel crosslinking (as indicated by Q at early time points) and differences in degradation kinetics and overall erosion time (8 vs. 10 days). These two formulations are referred to as low and high crosslinked gels in the subsequent studies described.

To examine the effects of mechanical loading on degradation, the effects of a 1 Hz, dynamic loading regime on gel degradation was examined using impermeable platens associated with the bioreactor. The impermeable platens prevent fluid exchange at the axial ends of the gel and confine fluid flow to the radial edges. Therefore, control gels were used to mimic the restriction in fluid exchange, allowing isolation of the effects of dynamic loading on degradation. It is important to note that due to the weight of the impermeable platen, an initial tare strain of 9% is applied to the low crosslinked gels while the more stiff, high crosslinked gels experience an initial tare strain of less than 1%. The loaded and control gels experience the same tare strain. For the low crosslinked gels, mass loss appeared similar for both experimental conditions (loaded and control), following a steady erosion profile up until 60-70% mass loss, at which point reverse gelation occurred. Swelling ratios increased from ~10 to ~28 over the course of degradation for both control and loaded gels. The pseudo first order rate constant, k', was significantly higher in the loaded gels compared to the control gels (p<0.01, Table II) indicating a faster gel degradation rate under a 1 Hz dynamic loading regime. The k' for the controls gels was significantly lower than the free swelling gels suggesting that either the initial tare strain and/or the restricted axial diffusion slowed degradation.

In the higher crosslinked gels, however, degradation was significantly longer for the control and loaded gels that were placed in the bioreactor, compared to the free swelling conditions. Within the bioreactor, mass loss reached only 50-70% mass loss after 15 days compared to complete degradation in 10 days under free swelling conditions. This difference indicates that restricted fluid exchange associated with the platens significantly affected degradation in the high crosslinked gels. Mass loss profiles indicated that degradation for the control and loaded samples were similar up to 50% mass loss at which time the loaded samples began degrading more rapidly. Swelling ratios increased exponentially from 8 to 50 in the loaded samples and 8 to 22 in the control samples. The pseudo first order rate constants were statistically higher in the loaded gels compared to control gels (p<0.05, Table II). However, k' values for both control and loaded samples were lower than the free swelling gels (p<0.0001).

TABLE II

Pseudo first order reaction rate constants (k') for gel degradation as function of loading under permeable platens.

| Hydrogel | Loading Condition | Rate Constant k' (days−1) | $R^2$ |
|---|---|---|---|
| Low Crosslinking | Control | 0.317 ± 0.061 | 0.90 |
| | Loaded† | 0.394 ± 0.067 | 0.97 |
| High Crosslinking* | Control | 0.126 ± 0.009 | 0.96 |
| | Loaded† | 0.163 ± 0.010 | 0.98 |

*significant effect of crosslinking density (p < 0.0001) based on two-way ANOVA
†significant effect of dynamic 15% strain at 1 Hz under porous platens (p = 0.002) based on two-way ANOVA The application of dynamic loading influences the macroscopic movement of fluid in and out of the gel as well as dynamically changes the apparent porosity of the gel. In gels with a lower crosslinking, the application of dynamic loading significantly enhanced degradation kinetics (as evident by a higher k' value). For the high crosslinked gels, the application of dynamic fluid flow did not have a significant effect on erosion profiles and degradation kinetics until reaching higher mass losses and swelling ratios. This observation indicates that erosion of the larger kinetic chains (associated with the late stages of degradation) is affected by the restricted fluid exchange in gels with a smaller mesh or pore size.

The effects of loading frequency on gel degradation was investigated for the low and high crosslinked gels. Specifically, frequencies of 0.3, 1, and 3 Hz were compared. For each loading condition, control gels were also examined and no statistically significant differences in their mass loss or swelling profiles were observed, which were also similar to the control data for the 1 Hz experiment. Mass loss profiles and swelling ratios as a function of degradation time for each of the dynamically loaded samples for both crosslinked gels were measured. Pseudo first-order rate constants were calculated based on the swelling ratio curves for all dynamically loaded gels and are given in Table II.

For the low crosslinked gels, loading frequency had no effect on the erosion profiles, overall degradation time, and on k'. Overall degradation time was approximately 7 days for each loading frequency. Swelling ratio versus time revealed similar trends for each frequency examined ranging from 10 to 30 over the course of degradation.

Significant differences, however, were observed in the high crosslinked gels as a function of loading frequency. A loading frequency of 3 Hz led to a faster overall degradation time of ~10 days. Loading frequencies of 0.3 Hz and 1 Hz showed similar degradation times with only ~60% mass loss after ~14-15 days. The k' for gels subjected to 0.3 and 1 Hz were similar, although significantly less than free swelling gels (p<0.001) and gels subjected to 3 Hz loading (p<0.0001, Table III). Swelling ratio plots also indicated significant differences between gels subjected to 3 Hz and gels subjected to 1 or 0.3 Hz.

TABLE III

Pseudo first order reaction rate constants (k') for gel degradation as function of loading frequency

| Hydrogel | Frequency (Hz) | Rate Constant k' (days−1) | $R^2$ |
|---|---|---|---|
| Low Crosslinking | 0.3 | 0.216 ± 0.036 | 0.96 |
| | 1.0 | 0.180 ± 0.006 | 0.99 |
| | 3.0 | 0.161 ± 0.034 | 0.90 |
| High Crosslinking | 0.3 | 0.089 ± 0.010 | 0.91 |
| | 1.0 | 0.101 ± 0.011 | 0.93 |
| | 3.0 | 0.218* ± 0.021 | 0.96 |

*significantly different than other frequencies with same crosslinking density (p < 0.001)

Loading frequency can influence degradation behavior through differences in fluid flow and/or the total number of cycles. Since differences were only seen in the high crosslinked gels at the 3 Hz loading frequency, these data suggest that the total number of cycles is not a dominant factor influencing degradation. For example, a 1 Hz loading regime applies 3.3× more cycles than a 0.3 Hz loading regime, yet no differences in degradation behavior were observed for the low or high crosslinked gels at these frequencies. However, the faster degradation times at 3 Hz for the high crosslinked gels suggests that enhanced convective transport is playing a role in gels with a lower mesh size. As noted above, increased fluid flow likely enhances transport of the larger degradation products (PEG crosslinks and poly (methyl methacrylate) kinetic chains) out of the hydrogel.

These results indicate that when gels with both low and high crosslinking are placed in the bioreactor with impermeable platens, degradation kinetics decrease leading to overall longer degradation times. Without being bound by any theory, it is believed that the restricted fluid exchange at the axial edges of the hydrogel affects gel degradation particularly at the later erosion time points. In the low crosslinked gels, the large tare strains resulting from the platen weight may also be a contributing factor. Lighter, permeable platens and a permeable base, which do not restrict fluid transport at the axial ends, were fabricated and tested. For the permeable platens, initial tare strains of 4% and 0.3% are applied to the low and high crosslinked gels, respectively. Initially, mass loss and swelling profiles for control gels cultured under permeable platens were compared to control gels under impermeable platens and free swelling gels in the absence of loading.

In the low crosslinked gels, mass loss profiles exhibited similar trends up to 3 days and ~20-30% mass loss. Interestingly, gels cultured under the permeable platens degraded the fastest in 5.9 days with significantly higher k' values than gels under impermeable platens (p<0.001) and those cultured under free swelling conditions (p<0.01, Table IV). Under conditions where axial fluid exchange is not a factor, the application of a 4% strain (imparted by the permeable platens) resulted in significantly faster degradation times. This finding indicates that decreasing the permeability due to a static strain, which would result in slower erosion times through decreases in the release of degradation products, is not a significant contributing factor at least for these low crosslinked gels. Mechanical degradation as a result of the tare strain, however, may be contributing to the increased degradation. When comparing degradation under permeable and impermeable platens, there are at least two contributing factors. The impermeable platens result in an increase in the tare strain (initial tare strains increase from 4 to 9%), but also a restriction in the fluid exchange. These findings indicate that restricted fluid exchange is a dominant factor influencing degradation behavior even for the low crosslinked gels.

TABLE IV

Pseudo first order reaction rate constants (k') for gel degradation as function of bioreactor culture conditions.

| Hydrogel | Culture Conditions | Rate Constant k' (days−1) | $R^2$ |
|---|---|---|---|
| Low Crosslinking | Free Swelling | 0.200* ± 0.016 | 0.99 |
| | Impermeable Platens | 0.137† ± 0.008 | 0.96 |
| | Permeable Platens | 0.317*† ± 0.061 | 0.90 |
| High Crosslinking | Free Swelling | 0.154* ± 0.011 | 0.98 |
| | Impermeable Platens | 0.076† ± 0.004 | 0.98 |
| | Permeable Platens | 0.126* ± 0.009 | 0.96 |

*significantly different than impermeable platens (p < 0.001)
†significantly different than free swelling (p < 0.01)

In the high crosslinked gels, the use of permeable platens resulted in mass loss profiles, overall degradation times and degradation kinetics similar to the free swelling gels. The gels under permeable platens and free swelling gels, however, degraded significantly faster than gels cultured under impermeable platens (p<0.001, Table IV). This result further indicates that restricting fluid transport at the axial ends of the gels significantly affects the overall degradation behavior.

Degradation was also assessed as a function of dynamic loading at 1 Hz for gels between a permeable platen and base. Mass loss and swelling were measured as a function of time for both crosslinked gels. There were no significant differences in degradation profiles or overall degradation for the low crosslinked gel under dynamic loading compared to the control gels (Table II). Swelling ratio versus time plots also showed no significant difference between loaded and control gels. In the higher crosslinked gels, dynamic loading had no effect on the degradation profile up until ~60% mass loss at which point, the dynamically loaded gels rapidly degraded with overall degradation times of ~7 days, compared to control gels, which did not completely degrade until ~11 days. Swelling ratio plots were similar for both loaded and control gels reaching values of ~20 for loaded gels after 7 days and for the control gels after 11 days. Statistical analysis by two-way ANOVA, however, revealed that crosslinking density and loading significantly influenced the degradation pseudo-rate constants of these gels cultured under permeable platens (p<0.001). However, there was no statistical interaction between these factors on k' (p=0.3).

In addition to characterizing mass loss and swelling ratios as a function of degradation, mechanical properties are also important. Therefore, compressive modulus was also measured as a function of degradation time for the low and high crosslinked gels when subjected to a 1 Hz loading frequency regime for the permeable platen setup. The compressive modulus decreased exponentially with degradation time as crosslinks were broken. In the low crosslinked gel, the modulus decreased from 26 to 7 kPa within 5 days. In the high crosslinked gels, the modulus decreased from 340 to 26 kPa by day 12.

When gels are placed in the bioreactor they are inherently subjected to a strain imparted by the weight of the platens. The level of the strain is largely dependent on the modulus of the hydrogel, where low moduli gels experience large tare strains and high moduli gels experience very little strains. However, as the gel becomes mechanically weak with degradation, the tare strain increases as the compressive modulus decreases. From the modulus data, the resulting strain applied by the weight of the permeable platen (27 mN) was estimated as a function of degradation time. The strain increased from 4 to 17% in 5 days of culture for the low crosslinked gels and from 0.3 to 4% for the high crosslinked gels in 12 days of culture. After 5 days of loading, the compressive modulus of the low crosslinked gels was immeasurable even though complete degradation had not occurred. The compressive modulus for the high crosslinked gels, however, decreased ~70% to 110 kPa over the same time period and was still measurable up to 12 days. The major difference between these two crosslinked gels is that the compressive modulus of the higher crosslinked gels is sufficiently high to resist the force subjected by the weight of the loading platen. For example, an additional ~20% strain is imparted on the low crosslinked gels only after 5 days of loading, whereas less than 4% additional strain is imparted on the higher crosslinked gels after 12 days of loading.

These results indicate that the application of dynamic mechanical loading significantly enhances degradation kinetics, leading to faster degradation times compared to unloaded conditions. The frequency of loading did not affect gel degradation for gels with low crosslinking, but did affect gel degradation for gels with higher crosslinking and lower mesh sizes when high frequencies of 3 Hz were employed. In addition, several design features associated with the mechanical loading bioreactor affected the degradation behavior. Specifically, the utilization of impermeable versus permeable platens significantly affected the degradation kinetics for both crosslinked gels, suggesting that restriction of axial diffusion may lead to slower degradation kinetics and overall degradation times. When axial diffusion was not a limiting factor, the large tare strains applied to the low crosslinked gels led to faster gel degradation suggesting a possible mechanism for mechanical degradation.

These PLA-b-PEG-b-PLA gels are highly water-swollen with initial water contents greater than 85% for both high and low crosslinked gels. In the absence of loading, these gels are known to degrade via bulk degradation mechanisms. In the presence of loading, the gels follow a similar degradation profile. However, loading generally shifts the curve to faster overall degradation times. Because of the highly water-swollen nature of these hydrogels, the mechanism of enhanced degradation with loading is likely due to increased convective transport. It has been shown that dynamic loading of cartilage explants leads to enhanced convective transport within cartilage. Convective transport of solutes (e.g., degradation products) are dependent on a number of factors including material stiffness, material permeability, and their partition coefficient, which are all related to crosslinking density. In this study, a constant displacement was applied to the hydrogels and therefore convective transport of degradation products is likely dependent on the latter two parameters. Computation modeling has shown that increasing loading frequency significantly increases the transport of larger solutes in cartilage, but has a little effect on transport and release of smaller molecules.

In some instances, mechanical degradation is a contributing factor to the overall degradation of these hydrogel. Mechanical degradation of linear polymers is known to occur under flow-induced conditions where large strains can lead to significant polymer chain extension resulting in chain scission. For the majority of degradation, the gels retain their shape and exhibit their predominant elastic behavior suggesting that gross mechanical degradation due to loading is likely not a factor. However, at very late stages of the degradation when the gels become mechanical weak and lose their 3D structure, mechanical degradation associated with larger tare strains may play a role in gel degradation. However, no gross mechanical breakdown in the hydrogels as a result of loading was observed.

Although the impact of mechanical stimuli on cell function has been a major focus in the field of cartilage tissue engineering, little is known about how these factors influence the degradation of the scaffold. This experiment shows how dynamic loading influences the degradation kinetics and erosion profiles of PLA-b-PEG-b-PLA hydrogels. Overall, these results demonstrate that mechanical loading influences the degradation behavior under certain loading conditions and gel crosslinking densities, while under other loading conditions and gel environments there is no effect.

Example 5

Materials and Methods
Hydrogel Formation

Poly(ethylene glycol) dimethacrylate (PEGDM) macromer was synthesized by reacting methacryloyl chloride to PEG (Fluka, MW=3 kDa) in the presence of triethylamine in dichloromethane for 24 hrs at 4° C. and purified by precipitations in ethyl ether. The percent methacrylation was 90-95% and purity was >99% as determined by $^1$H NMR (Varian YVR-500S). Hydrogel cylinders (5 mm×5 mm) were fabricated by dissolving 10 or 20% (w/w) PEGDM in phosphate buffered saline (PBS, pH 7.4) with cytocompatible photoinitiator concentrations of 0.05 or 0.0125% (w/w) 1-[4-(2-Hydroxyethoxy)-phenyl]-2-hydroxy-2-methyl-1-propane-1-one (Ciba Specialty Chemical), respectively, and exposing to 365 nm light (6 mW/cm$^2$) for 10 minutes.

Hydrogel Characterization

Cell-free hydrogels (n=4) were swollen in PBS+1% penicillin-streptomycin (PBS+P/S) for 48 hours, weighed to determine the equilibrium swollen mass (MS) and lyophilized to determine the dry polymer mass (MD). The volumetric swelling ratio, Q, was calculated from the equilibrium mass swelling ratio (MS/MD) and gel crosslinking density (rx) was determined using a modified version of the Flory-Rehner equation neglecting chain ends. Tangent modulus was determined on swollen constructs by applying a constant strain rate under unconfined compression (0.5 mm/min) (MTS Synergie 100, 10N).

Chondrocyte Isolation and Encapsulation

Cartilage was harvested from the patellar-femoral groove of 1-3 week old calves (n=2) (Research 87) within 24 hours of slaughter. The tissue was digested in 500 units/mL collagenase II (BD Worthington) in Dulbecco's minimal essential medium (DMEM, Invitrogen) supplemented with 5% fetal bovine serum (FBS, Invitrogen) for 16 hours at 37° C. Isolated chondrocytes were washed and resuspended in chondrocyte media (DMEM supplemented with 20% FBS (v/v), 0.04 mM L-proline, 50 mg/L L-ascorbic acid, 10 mM HEPES buffer, 0.1 M MEM-nonessential amino acids, 1% penicillin-streptomycin, 0.5 mg/mL fungizone, and 20 mg/mL gentamicin (Invitrogen)). Chondrocytes were added to sterile macromer/photoinitiator solutions at 50×10$^6$ cells/mL and photopolymerized as described above. Cell-hydrogel constructs were pre-conditioned under free swelling conditions for 48 hours at 37° C. and 5% CO$_2$ in chondrocyte medium prior to loading in the loading apparatus.

Mechanical Stimulation

Multiple loading apparatuses of the invention, which fit into a standard incubator, were used. Each apparatus holds a standard 24-well tissue culture plate in which each well is associated with an impermeable loading platen, of which 12 samples are subject to continuous, unconfined dynamic 15% strain at 1 Hz, applied from 0 to 750 mm in a sinusoidal waveform, while 12 samples serve as unloaded controls. Gels were submersed in 2 mL of chondrocyte media, refreshed every 48 hours. After the pre-conditioning period (labeled time 0), samples were then loaded into the apparatus for 1, 3, 5, and 7 days. Cell viability was qualitatively assessed using a live/dead assay (Invitrogen) post-encapsulation and after 7 days of loading. Cell viability was high with no observable differences temporally or between the 10% and 20% gels.

Gene Expression

Loaded and control constructs were removed from the bioreactor at specific time points (n=3 per condition) and immediately frozen in liquid nitrogen. RNA was extracted by TRI Reagent (Sigma) and reverse transcribed using the iScript cDNA Synthesis Kit (Biorad). Real-time RT-PCR (Bio-Rad iCyler4) was performed using custom designed and validated sense and anti-sense primers, and iQ™ SYBR® Green Supermix (Bio-Rad). Data are presented as:

$$\text{Relative Expression} = \frac{E_{(HKG)}^{C_{T(HKG)}(sample)}}{E_{(GOI)}^{C_{T(GOI)}(sample)}} \text{ or as}$$

$$\text{Normalized Expression} = \frac{E_{(GOI)}^{\Delta C_{T(GOI)}(calibrator-sample)}}{E_{(HKG)}^{\Delta C_{T(HKG)}(calibrator-sample)}}$$

where E is the efficiency of the gene amplification, GOI is the gene of interest, HKG is the housekeeping gene, and CT is the cycle threshold point. For normalized gene expression, the loaded samples were normalized to their respective unloaded controls (referred to as calibrator). Efficiency was determined using cDNA dilutions over 4 orders of magnitude, and ranged from 88-110%. L30, a mitochondrial ribosomal protein, was used as the HKG because it was stable throughout the experiment (unpublished data).

Expression and Visualization of Extracellular Matrix Molecules

Loaded and control constructs were removed from the bioreactor at specific time points (n=3 per condition) and cut in half along their horizontal axis. Half was used for histology and half was used for immunofluorescent staining. For the in situ immunofluorescent technique, construct halves were cut again along their vertical axis and placed in PBS supplements with 0.5 Units/mL Chondroitinase ABC (Sigma) and 1% BSA (Sigma) to expose the chondroitin-6-sulfate epitope. Samples were treated for one hour with anti-chondroitin-6-sulfate (clone MK-302, Chemicon) (1:50) in DMEM+20% FBS, rinsed twice with Earle's Balanced Salt Solution (EBSS, Gibco) and placed for one hour in DMEM+20% FBS with goat anti-mouse IgG labeled with Alexa Fluor 546 (1:20) (Invitrogen). Live cells were counterstained with 5 mM calcein AM (Invitrogen). Images were captured in 3 different regions of interest (middle of gel) for a total of 15 cells per condition using confocal microscopy (Zeiss LSM 5 Pascal). The remaining hydrogel half was fixed in paraformaldehyde, dehydrated, embedded in paraffin, sectioned (10 mm), and stained for negatively charged glycosaminoglycan (GAGs) molecules using Safranin-O/Fast Green and the cell nuclei were counterstained using hemotoxylin.

Statistical Analysis

Data are represented as mean±standard deviation. Relative and normalized gene expression values were analyzed using one-way analysis of variance (ANOVA) and Tukey post-hoc to determine the statistical significance as a function of culture time for control and dynamically loaded samples in both crosslinked systems. Multiple factor ANOVA was performed using a general linear model with Tukey multiple comparisons to determine the significance of culture time, gel crosslinking and loading and their interactions on gene expression. A confidence level of 0.05 was considered significant.

Results

Hydrogels were fabricated from 10% and 20% (w/w) PEGDM to form low and high crosslinked gels, respectively and their macroscopic properties are listed in Table V. Doubling the macromer concentration resulted in an increase in gel crosslinking density, a 48% decrease in equilibrium swelling ratio, and 850% increase in compressive modulus.

TABLE V

Properties of PEG hydrogels

| Hydrogel | PEGDM % (w/w) | Crosslinking Density (mol/L) | Swelling Ratio (Q) | Compressive Modulus (kPa) |
|---|---|---|---|---|
| LOW CROSS-LINKED | 10 | 0.10 ± 0.007 | 12.0 ± 0.4 | 70 ± 10 |
| HIGH CROSS-LINKED | 20 | 0.40 ± 0.016 | 6.3 ± 0.1 | 600 ± 60 |

Gene expression for collagen II and aggrecan, two common ECM molecules of hyaline cartilage, and collagen I, a chondrocyte de-differentiation indicator, were analyzed as a function of gel crosslinking density in the absence of loading. Collagen I was expressed 1,000 and 100,000 times less than collagen II in the low and high crosslinked gels, respectively, indicating that the native chondrocyte phenotype was maintained. Aggrecan expression was significantly less compared to collagen II for each crosslinked system over the culture period. All genes were significantly down-regulated in high crosslinked gels compared to low crosslinked gels ($p<0.001$).

Gene expression was also analyzed as a function of dynamic loading and gel crosslinking. Similar to the unloaded samples, all genes were expressed higher in the low crosslinked gels compared to the high crosslinked gels over the course of the experiment ($p<0.001$). A down-regulation of collagen II and aggrecan was observed at day 3 in the low crosslinked gels. However by day 5, expression levels recovered to levels in the pre-conditioned samples. In the higher crosslinked gels under dynamic load, no statistically significant temporal differences in gene regulation for collagen II and aggrecan were observed.

To isolate the effects of loading on chondrocyte response, gene expression of the dynamically loaded hydrogels were normalized to their respective unloaded samples at each time point. In the low crosslinked gels at day 3, loading resulted in a 4-fold down-regulation in collagen II and a 2-fold down-regulation of aggrecan. By day 7, there were no significant differences in gene expression between the unloaded and loaded gels. In the higher crosslinked gels, no significant differences were observed due to loading.

A multiple factor ANOVA revealed that crosslinking density affected aggrecan and collagen I and II ($p<0.001$) expression, culture time had a significant affect on collagen I ($p<0.01$) and aggrecan ($p<0.05$) expression, but no affect on collagen II expression ($p=0.09$), and dynamic loading had no significant effect on the genes examined. A significant interaction was noted between culture time and crosslinking density for all genes examined ($p<0.01$).

Based on the observation that the application of dynamic loading had little effect on the expression ($p>0.05$) of the genes examined here, it is believed that the formation of a pericellular matrix (PCM) may protect the cells from the biomechanical environment. The formation of the PCM was assessed through staining for proteoglycans using two approaches: a live in situ immunofluorescent approach and standard histology. The former approach allows for real-time imaging of live cells and their surrounding matrix within the hydrogel in the hydrated state, while the latter approach necessitates fixation of the specimen.

The presence of a PCM, as determined by positive staining for chondroitin-6 sulfate, in the unloaded, low crosslinked gels was observed as early as day 1 by immunofluorescent staining. By day 3 a uniform PCM with a mean thickness of 5.7±1.1 mm surrounded most of the cells and diffusion of proteoglycans (PGs) away from the cells was visualized by day 5. In contrast, the loaded samples showed fewer cells with a PCM at day 1 but by day 3, a loosely ill-defined PCM was present. In the high crosslinked gels, no differences were observed in PCM formation between the unloaded and loaded gels over time. The mean PCM thickness was 2.9±1.0 mm with no evidence of PG diffusion in the extracellular space.

Histological micrographs for the low and high crosslinked gels at day 1 and day 7 were imaged. At day 1, little staining was present in the ECM of both gels. With increased culture time, dark staining was present throughout the construct in the low crosslinked gels indicating that proteoglycans had diffused into the extracellular space. However, in the higher crosslinked gels, proteoglycans were restricted to the immediate vicinity surrounding the cells with no significant staining present in the bulk hydrogel. There were no differences observed as a function of loading. This experiment was restricted to following development of proteoglycans, specifically associated with chondroitin-6-sulfate.

Discussion

When isolated chondrocytes are encapsulated in PEG hydrogels, they begin synthesizing tissue-specific molecules that form a PCM and eventually diffuse into the extracellular space to form a macroscopic tissue. It has been shown that increasing crosslinking density of PEG hydrogels results in decreased diffusion of ECM molecules through the hydrogel. As a result, matrix components are entrapped and restricted to the pericellular regions in gels with high crosslinking. This experiment showed that crosslinking density impacts the evolution of the PCM, resulting in a thin and dense PCM in gels with high crosslinking and a thick and diffuse PCM in gels with low crosslinking. These differences in PCM development, that results from differences in gel crosslinking, impact both the biochemical and biomechanical environment surrounding the chondrocytes.

In cartilage, chondrocytes interact with their surrounding environment to receive biochemical cues from the PCM and ECM. These interactions are believed to be essential in the regulation of tissue development and maintenance. In this study, it was demonstrate that, in the absence of loading, the PCM forms within 3 days post cell encapsulation regardless of the gel structure, but that the physical structure of the PCM is highly dependent on the gel crosslinking. Interestingly, gene expression of collagen I and II and aggrecan was significantly reduced in gels that exhibited a thin, dense PCM, associated with the high crosslinked gel, compared to gels exhibiting a thick, diffuse PCM, associated with the low crosslinked gel. These results suggest a potential biochemical regulation of the cells possibly through differences in the physiochemical nature of the PCM (e.g., matrix diffusion limitations in the higher crosslinked gels may lead to differences in PCM composition) or through differences in the diffusivity properties of the PEG hydrogel, which may impact diffusion of growth factors or other signaling molecules involved in gene expression.

Furthermore, assessment of temporal changes in ECM gene expression within the low crosslinked gels indicates a potential link to matrix development through outside-in signaling. Specifically, the present study illustrates a down regulation in collagen II and aggrecan gene expression at day 5 in the control samples and at day 3 in the loaded samples, but by day 7 gene expression levels returned to their previous values. It is possible that the formation of the PCM and/or the initial evolution of ECM may regulate gene expression through changes in cell-matrix interactions and/or through binding, sequestering and/or activation of signaling molecules important in gene regulation. As matrix molecules, such as aggrecan, are deposited into the PCM they undergo modification before depositing into the ECM regions. This process may alter the biochemical composition of the PCM as tissue initially forms. Together these changes may influence the biochemical regulation of the cells.

In addition to biochemical regulation, the PCM is likely to have an important biomechanical function in chondrocytes. Studies have shown that when the PCM forms around chondrocytes encapsulated in PEG or agarose hydrogels, the PCM provides a mechanically protective barrier around the cells, reducing cellular strain. For example, when chondrocyte-laden PEG hydrogels of different crosslinking densities were subjected to compressive strains, cell deformation was highest in gels with the highest crosslinking density, but as the PCM developed cell strain was significantly reduced. This reduction was more significant in gels with higher crosslinking density indicating a stiffer PCM. These studies show that evolution of the PCM directly influences the degree of cell deformation. In this study, dynamic loading hindered PCM development in the low crosslinked gels during the first day of loading, but did not affect PCM development in the high crosslinked gels. It is possible that initially (in the absence of a PCM) the higher levels of cellular strain imparted on the cells by the higher crosslinked gel results in a greater need for a protective PCM. Alternatively, loading may enhance diffusion of matrix molecules away from the cells in the low crosslinked gels delaying the formation of the PCM, while in the high crosslinked gels matrix deposition is restricted to the pericellular regions. Once the PCM forms, it appears to protect the cells from the applied loads and not affect gene regulation, although it is possible that loading may have influenced protein synthesis and deposition.

These results indicate that mechanical loading influences PCM formation during initial culture periods and has only a minor impact on gene expression. Crosslinking density, however, plays a role in PCM evolution and development and gene regulation. The formation of the PCM may be the initial innate function of isolated chondrocytes, and that changes in the PCM structure and/or composition may significantly impact chondrocyte gene expression. Additional studies are necessary to elucidate the PCM composition and to better understand the impact of "outside-in" signaling on chondrocyte function during early tissue development. Furthermore, diffusivity properties of the hydrogel must also be considered in examining cell carriers with different crosslinking densities.

Simple changes in the gel structure affect chondrocyte gene expression, PCM formation and matrix evolution. Dynamic loading may influence chondrocyte response at very early time points where limited PCM and ECM has been produced. These results indicate that loading affects PCM formation in the low crosslinked gels.

Example 6

Materials and Methods hMSCs were isolated from the marrow of a single male donor via hMSC selective attachment to tissue culture treated polystyrene. Poly(ethylene glycol) diacrylate (PEGDA) macromer was dissolved at 10% (w/w) in either basal media, chondrogenic differentiation media, or osteogenic differentiation media with 0.05% (w/w) photoinitiator (12959, Ciba Specialty Chemical). Passage 4 hMSCs were trypsinized, pelleted, and then resuspended in one of the three macromer solutions at a concentration of $5 \times 10^6$ cells/mL and polymerized under 365 nm light at ~2 mW/cm$^2$ for 10 minutes. Cell seeded scaffolds (~5 mm in height and 5 mm in diameter) were allowed to incubate for 24 hours prior to being loaded into a custom-designed loading apparatus with permeable platens. Samples were subjected to a dynamic strain of 10% at 0.3 Hz intermittently (0.5 hr on, 1.5 hr off, repeated for 16 hours, followed by 8 hr off) for 2 weeks. Loaded samples and free swelling controls were removed at 7 days and 14 days.

Total RNA was isolated and real time RT-PCR was preformed to analyze gene expression for the following genes: RUNX2/Cbfa1, alkaline phosphatase (ALP), aggrecan (ACAN), SOX9, Collagen 1 (Col1), Collagen X (ColX), and Nucleostemin (Nuc). Additionally, histological analysis was conducted. 10 μm slices of samples from each treatment group were stained by Mason's Trichrome for collagen, Safranin O/Fast Green for glycosaminoglycans (GAG), and von Kossa for mineralization. The Live/Dead® assay combined with confocal microscopy was used to determine viability of the encapsulated cells over the course of the study. Data is presented as mean±standard deviation (n=4) and a confidence level of 0.95 was considered significant.

Results and Discussion

Initially unstrained hMSCs in chondrogenic media upregulate SOX9 to a greater degree than dynamically loaded samples. However, after 14 days the dynamically loaded samples exhibit a greater upregulation of SOX9, a gene essential to chondrogenic differentiation. The greater presence of GAG staining in the loaded samples also indicates that dynamic loading makes a positive contribution to the chondrogenic differentiation of encapsulated hMSCs. However, dynamic loading in osteogenic samples appears to have an inhibitory affect on the osteogenic differentiation of hMSCs encapsulated in PEGDA scaffolds, as shown by the greater degree of mineralization staining in the unstrained osteogenic sample.

Example 7

Material Manufacture

In brief, rods were prepared from a monomer solution of 80% v/v HEMA (Polysciences), 2 mol % tetraethylene glycol dimethacrylate (Polysciences), and 1.5% w/v 2,2-dimethoxy-2-phenyl-acetophenone (Irgacure 651, Ciba Specialty Chemical) in ethylene glycol/water which was placed in teflon molds (200 μm diameter, 4 mm height). The solution was exposed to 365 nm light at ~4 mW cm$^{-2}$ for 15 min. The equilibrium water content for poly(HEMA) rods were ~35%.

The bulk hydrogel matrix was prepared from crosslinked poly(ethylene glycol) (PEG). In brief, poly(ethylene glycol) dimethacrylate was synthesized by reacting PEG (3000 MW, Fluka, St. Louis, Mo.) with excess methacryloyl chloride in the presence of triethylamine in methylene chloride for 36 hours at 4° C. The reaction by-products were removed by precipitation in cold acetone. The final product, poly(ethylene glycol) dimethacrylate was further purified and recovered by precipitation 2× into cold ethyl ether. The product was determined to be 88% methacrylated as determined by $^1$H NMR (Varian VYR-500). Specifically, the area under the curve for the vinyl resonances ($\delta$=5.7 ppm and $\delta$=6.1 ppm) associated with the methacrylate substitution was compared to that of the methylene protons ($\delta$=4.3 ppm) in the PEG backbone. Poly(ethylene glycol) (PEG) hydrogels were fabricated from 10% PEG dimethacrylate (PEGDM) and 0.05% Irgacure 2959 (Ciba Specialty Chemical) in phosphate buffered saline and polymerized as described above. The equilibrium water content for a PEG hydrogel prepared from 10 wt % PEGDM was ~90%.

The rods were swollen in phosphate buffered saline (PBS) then manually placed in alignment within dumbbell shape moulds (ASTM D1708; cross sectional area in neck region=2.5×0.75 mm). Hydrated rods were encapsulated either immediately (minimizing diffusion of PEG into the rod) or allowed to dry for 30 min or 1 hour before a period of exposure to PEG macromer solution (soak time—from 5 to 180 min). The rods were encapsulated via photopolymerization by exposing the PEG macromer solution to 365 nm light at ~4 mW cm$^{-2}$ for 10 min. Soak time was utilized to permit diffusion and penetration of the PEG bulk gel into the rods before encapsulation. Ten rods were positioned within each mould prior to encapsulation. The fiber composites were allowed to freely swell in phosphate buffered saline for several hours at room temperature to reach equilibrium prior to testing. To visualize the rods and bulk PEG matrix, and use fluorescent microscopy to visualize the extent of interpenetration between the two hydrogel networks, 0.1% (w/w) fluorescein-o-methacrylate (Sigma-Aldrich) was incorporated into the poly(HEMA) rods, and 0.1% (w/v) rhodamine methacrylate (Sigma-Aldrich) was incorporated into the bulk PEG hydrogel matrix during polymerization. Images were acquired by confocal laser scanning microscopy (Ziess LSM 5 Pascal) using a 4× objective.

Where required for macro-mechanical analysis, additional samples of the poly(HEMA) or PEG hydrogels in isolation were made, by simply filling the moulds with the solutions and polymerizing. When require for cell culture, samples were prepared in the same manner, but treated with collagen type I to facilitate cell attachment prior to polymerizing, as detailed below. Five specific test groups were manufactured for further analysis, to investigate mechanical characteristics and cell culture and mechanical loading as appropriate. These groups are detailed in Table VI below.

TABLE VI

Description of Material Groups

| | | Analysis protocols adopted | | |
|---|---|---|---|---|
| Group name | Description | Macro | Micro | Cell Culture & Mech Loading |
| PEG | 100% PEG hydrogel | X | | X |
| Poly(HEMA) | 100% Poly(HEMA) hydrogel | X | | X |
| COMP-direct | Rod & matrix composite - hydrated rods encapsulate immediately | X | X | X |
| COMP-30 min | Rod & matrix composite - rods dried for 30 mins + 1 hr PEG soak time | X | X | |
| COMP-1 hr | Rod & matrix composite - rods dried for 1 hr + 1 hr PEG soak time | X | | |

Macro-mechanical Analysis

Dumbbell samples were prepared for macro-mechanical analysis, in order to determine quasi-static material properties. Ten samples for each of the five test groups were manufactured. Both end of each dumbbell were carefully superglued between two pieces of cardboard, maintaining the samples in their hydrated state. The cardboard could then be secured in the grips of the materials testing machine (Instron 5564, UK) for testing, without the need to directly grip and subsequently damage the sample. Cardboard was glued to completely cover the wider ends of the sample, and just leave the uniform rectangular centre region in the test length (6 mm). Each dumbbell was first secured in the top grip, and then allowed to hang under its own weight before securing in the bottom grip. Hydrated samples were then strained to failure at a rate of 15%. min$^{-1}$ at room temperature, recording force at 10 Hz with a 2.5N load cell, enabling a stress-strain curve to be produced for each sample and the modulus to be calculated over the linear region.

Micro-mechanical Analysis

A further eight hydrated samples were prepared for micro-mechanical analysis from both the COMP-direct and COMP-30 min groups, enabling their fiber composite behavior to be investigated. Following the protocols described for macro-mechanical testing, each dumbbell in its hydrated state was attached to cardboard at both ends to give a rectangular test region 6 mm in length, before loading into a custom designed micro-mechanical test rig, which allowed samples to be strained whilst they were viewed with a confocal microscope. Once a sample was secured in the rig, the rig was positioned on the stage of an inverted confocal microscope (Leica Systems, UK) and rods within the centre of the sample located, using a ×4 magnification objective lens under brightfield light settings.

The rods were imaged in the unstrained and hydrated state, before the sample was strained to 5% and the same area of the sample immediately reimaged. This process was repeated, with strain was applied to the sample and the rods immediately imaged, in 5% increments until the sample failed. All tests were performed at room temperature. By comparing the images at each increasing strain increment, the extents of fiber sliding and fiber extension within the composite during gross loading were examined. Two identifiable marks were selected along the length of each fiber, as far apart from each other as possible. Orthogonal directions x and y were defined, with the y axis following the direction of loading, and these used to establish the two-dimensional position of each mark through the series of images. Taking relative values of the coordinates from image to image, the extension of each rod and the relative movement (shearing) between rods were both recorded in micrometers.

Collagen Immobilization

Collagen type I was immobilized to poly(HEMA) hydrogels to permit cellular attachment. In brief, poly(HEMA) hydrogel rods labeled with rhodamine or poly(HEMA) dumbells were sterilized in 70% ethanol for 2 hours. Under sterile conditions, the rods were rinsed multiple times in dry acetone to remove excess water and then reacted with 20 mM 1,1' carbonyl diimidazole (CDI) (Sigma-Aldrich) in dry acetone for 1 hour at room temperature. The poly(HEMA) hydrogels were rinsed and sonicated three times in dry acetone to remove unreacted CDI. The hydrogels were dried for several hours under high vacuum and then reacted with 0.3 mg of collagen type I (BD Biosciences) in 1 ml of carbonate/bicarbonate buffer at pH of 10.4 for 48 hours at 4° C. on an orbital shaker. Prior to use, the hydrogels were rinsed and stored in sterile phosphate buffered saline (pH 7.4).

Cell Culture Studies

Using collagen coated rods, the ability of the hydrogel composite to maintain fibroblasts in culture was examined, and the effect of mechanical strain on collagen gene expression in the composite compared with that in two different control samples. As a proof of concept, NIH/3T3 fibroblasts (ATCC) were employed from passages 3-5, and the two control materials were either collagen coated poly(HEMA), to provide a 2-D loading environment, or the bulk PEG gel for 3-D encapsulation. All samples were moulded within the same dumbbell test piece for comparison.

For cell seeded fiber composites, approximately 50 rods were placed in each well of a 6-well non-treated tissue culture plate, and covered with approximately 1 million cells in 1 ml of culture medium without serum per well. Culture medium was comprised of DMEM 10 mM HEPES, 0.1M non-Essential Amino Acids, 200 mM L-glutamine, 1×P/S, and 0.5 µg mL$^{-1}$ of fungizone (Invitrogen). The cells were allowed to attach to the rods overnight, after which time the remaining unattached cells were removed from the well and the rods covered with fresh culture medium supplemented with 10% foetal bovine serum. The cell seeded rods were cultured for one week within the 6 well plates, replacing the culture medium every two days, and then encapsulated in the bulk PEG hydrogel, as described in the methods for macro- and micro-mechanical analysis. These fiber composite dumbbell samples were then transferred to individual 6 well plates and cultured for several hours prior to the mechanical loading study. Cell viability was assessed using calcein AM, which stains the cytosol of live cells green, while the rods were visualized by the incorporated rhodamine.

Collagen type I coated poly(HEMA) control samples were seeded with NIH/3T3 fibroblasts onto the surface of poly (HEMA) dumbbells by placing 50 µl of cell solution containing 850,000 cells/ml in serum free culture medium. The cells were allowed to attached for 1 hour, after which time culture medium containing serum was gently added to the well and the samples cultured for 1 week prior to loading.

PEG control samples were prepared by encapsulating NIH/3T3 fibroblasts (10 million cells per mL macromer solution) in a bulk PEG hydrogel containing 0.1 mg/ml collagen type I. The bulk PEG hydrogel for all cell studies was prepared from a 20 wt % PEGDM solution to form a robust hydrogel suitable for mechanical loading in the bioreactor.

Mechanical Loading

For each material, about 7 unloaded control samples were left free swelling for 24 hours, whilst a second group of about 7 were secured within a custom designed bioreactor, to be subjected to 5% cyclic tensile load at 1 Hz for 24 hours. The bioreactor utilizes a stepper motion and sliding mechanism to simultaneously load 21 individual specimens attached to a single loading arm, following a sine wave shaped loading pattern. Motion of the actuator arm is monitored by direct measurements, using the onboard linear variable displacement transducer (LVDT). The dumbbell shaped specimens were secured at each end via screw-tightened clamps, with one clamp attached to the loading arm, while the other clamp fixed the sample in place. Once secured, each sample was covered with 2 mL of culture medium prior to mechanical stimulation. The loaded samples and unloaded controls were compared through visualization of the cell morphology and an assessment of changes in collage gene expression.

Cell Morphology

Three specimens from each group were used for the assessment of cell morphology. These were fixed in 4% formaldehyde for 2 hours and then stained with Alexa Fluor® 488 phalloidin (1:40, Invitrogen) for 20 minutes followed by DAPI for 5 minutes. Images were acquired by laser scanning confocal microscopy (Zeiss LSM 5 Pascal) using a 20× magnification objective lens.

Gene Expression

The remaining specimens from each group (n=3-4 per condition) were immediately placed into TRK lysis buffer (Omega) and snap frozen in liquid nitrogen to lyse the cells. Samples were stored at −80° C. until further analysis. Prior to RNA isolation, samples were mechanically homogenized using a motorized morter and pestle (VWR) and the homogenized lysate centrifuged through a Homogenizer Column (Omega) for 5 min at 14000 r.p.m. The flowthrough was transferred into an E.Z.N.A. microelute column (Omega) and RNA isolation was carried out per the manufacturer's instructions. RNA purity was determined using absorbance ratios at 260/280 nm and 260/230 nm and quantified using absorbance at 260 nm with Beer's Law on the NanoDrop 1000 system (Thermo Scientific). Purified RNA was eluted from the E.Z.N.A. column using DEPC treated water and stored at −80° C. until further analysis. RNA was converted into cDNA using High Capacity cDNA Reverse Transcription Kit (Applied Biosystems) according to manufacturer's instructions. Real Time PCR was performed using Fast SYBR Green Master Mix (Applied Biosystems). Custom primers were designed using Primer Express software (Applied Biosystems) and were validated both for efficiency (L32 and Collagen Type 1α) and stability of the housekeeping gene L32, a mitochondrial ribosomal protein. Primers were used at 200 nM Collagen Type 1α and 300 nM L32 concentrations in the PCR reaction. Data are presented as either:

$$\text{Relative Expression} = \frac{E_{HKG}^{C_t\,SAMPLE,HKG}}{E_{GOI}^{C_t\,SAMPLE,GOI}}$$

or $$\text{Normalized Expression} = \frac{E_{HKG}^{Avg\,C_t\,CAL,HKG - C_t\,SAMPLE,HKG}}{E_{GOI}^{Avg\,C_t\,CAL,GOI - C_t\,SAMPLE,GOI}}$$

where E is the efficiency of the primer, $C_{t\,SAMPLE}$ is the cycle number where the sample crosses the threshold, Avg $C_{t\,CAL}$ is the average cycle number where the calibrator samples (unloaded control of the corresponding loaded sample) crosses the threshold, HKG is the housekeeping gene and GOI is the gene of interest.

Results

Fiber Composite Manufacture

Fiber composites were fabricated from stiff fiber-like hydrogel rods entrapped in a loosely crosslinked hydrogel matrix. Rods were manufactured from crosslinked poly(2-hydroxyethyl methacrylate) (poly(HEMA)) while the bulk matrix was based on crosslinked poly(ethylene glycol) hydrogels. Rods were manufactured to an average length of 2.8±0.1 mm and diameter of 360±8 μm (n=8) in their swollen state.

The rods were successfully incorporated into a fiber composite, by creating an interpenetrating network, where the degree of penetration of the bulk PEG hydrogel precursors into the rods was controlled by adjusting the time allowed for that diffusion process to occur prior to polymerization. Immediately polymerizing hydrated rods encapsulated within the PEG hydrogel resulted in minimal interlocking between the PEG macromer and the rods as indicated by the microscopy image. To expedite diffusion and create an interpenetrating network, the rods were dried for 30 min or 1 hour and the PEG macromer was allowed to diffuse into the rods for varying soak times from 5 min to 180 min. Microscopy images illustrating the effects of drying time for a 1 hour soak time were captured. Longer dry times resulted in stronger staining for the PEG hydrogel within the rods, compared to shorter dry times. The average distance of diffusion was semi-quantified as a function of dry time and soak time for 30 min and 1 hour dry times. An increase in soak time resulted in a greater mean diffusion distance particularly within the first 50 min, while increasing the soak time further had less of an effect on diffusion distance. Soak time was significant for the rods which were dried for one hour (p<0.00001), but there was more variability for the rods which were dried for 30 min and soak time was not statistically significant (p=0.14).

Macro-mechanical Analysis

Five different materials were analyzed. The PEG and poly (HEMA) materials were tested in isolation, along with 3 composites which are referred to as COMP-direct, COMP-30 min and COMP-1 hr, representing the different drying and diffusion times, each of which are detailed in Table VI. Rods were successfully positioned in the central region of the dumbbell mould, and the PEG macromer solution pipetted in, to fully surround and encapsulate them. Uniform and parallel arrangement of rods was complex, but by placing rods individually, it was ensured that the length of rods overlapped across the width of the specimen, to prevent loading of the PEG gel in isolation.

A typical stress-strain curve for a sample in each test group was plotted along with mean data for the ultimate tensile strength and modulus of each test group. Poly(HEMA) rods in isolation were clearly significantly stronger than the PEG gel or any of the composite materials, with a mean modulus of 0.62±0.07 MPa. Samples in the four test groups incorporating PEG hydrogel all showed a linear loading curve, followed by abrupt failure as the gel fractured. In composite samples, fracture always occurred specifically within the PEG bulk gel, with the PEG breaking in a jagged manner around the rods.

The samples made solely with PEG gel had the lowest tensile stress and modulus, while the three composites demonstrated mechanical properties between their two component materials. It was evident that increased interpenetration between the PEG matrix and poly(HEMA) rods increased both the UTS and the modulus of the resulting composite.

Micro-Mechanical Analysis

Micromechanical analysis of COMP-direct and COMP-30 mins samples enabled the fiber composite behavior to be examined. Typical images of a sample from each group were taken. The integration of the rods and gel was apparent in the COMP-30 mins samples, with smooth edges to the rods, and a more uniform consistency to the PEG gel. Series of microscopy images from a typical COMP-direct and COMP-30 mins sample during straining were also taken. Relative movement between fibers was apparent in some areas of the images.

Data quantifying the tissue micromechanics in response to applied strain was determined, expressing the mean amount of fiber extension and the mean movement between fibers for (a) COMP-direct, and (b) COMP-30 mins samples, with both parameters expressed in micrometers for direct comparison. Extension of COMP-direct samples demonstrated equivalent levels of rod extension and rod shearing, with the local tensile strains within rods equating to around 25% of the gross applied strain. Increased interpenetration between the PEG matrix and poly (HEMA) in the COMP-30 mins samples led to increased rod extension, and a subsequent reduction in rod shearing, leading to tensile strains along the rods accounting for around 30% of the overall strain.

Cell Culture and Mechanical Loading Studies

NIH/3T3 fibroblasts attached well to the collagen coated poly(HEMA) rods. After one week of culture on individual rods, cell spreading was evident, with live cells extending their processes along the rods, and organizing their actin cytoskeleton to ensure good attachment. Fibroblasts seeded rods were encapsulated in bulk PEG hydrogel matrix and cultured for up to 1 week. A partial 3D rendering of cells in the fiber composite after 24 hours demonstrate that they remain localized along the surface of the fibers and retained their organized cytoskeletal structure lining the surface of the rods. Cell viability was confirmed for up to 1 week of culture.

The role of the culture environment in mediating cellular response to mechanical stimulation was assessed. Three environments were created: i) fibroblasts cultured on 2D poly (HEMA) surfaces immobilized with collagen type I, replicating the attachment surface seen by the cells on the rods, but in the absence of a surrounding bulk matrix, ii) fibroblasts encapsulated within a 3D bulk PEG hydrogel containing entrapped collagen type I, to mimic the 3D culture environment surrounding the rods, and iii) the cell-laden fiber composite material fabricated under similar conditions to the COMP-DIRECT samples described above, combining these environments.

Loaded constructs in each group were subjected to 5% dynamic tensile strain, at 1 Hz for 24 hours and compared with unloaded, free swelling controls. Cell morphology was assessed by staining for actin filaments. No observable differences were noted in cell morphology or actin filament organization between the controls and loaded specimen. Actin filament organization was generally similar for the 2D poly(HEMA) and fiber composite specimens. In the bulk PEG hydrogels, cells were uniformly dispersed throughout the matrix and retained a largely rounded morphology with no organization of their actin filaments.

Collagen type I expression was evaluated initially in the unloaded control samples from each group, to assess the impact of the culture environment. When fibroblasts were cultured in the 2D poly(HEMA) environment, their collagen type I expression was ~3-fold higher than that of fibroblasts cultured in either of the encapsulated 3D environments. However, when looking specifically at the effects of loading, by normalizing each loaded sample to its unstrained control, collagen type I expression was 3-fold higher in the fiber composite material compared to either the 2D poly(HEMA) specimen or the bulk PEG hydrogel.

Discussion

A novel fiber composite hydrogel material was produced to examine mechanotransduction. The cells were sustained within a three dimensional environment in which the local strain mechanics were comparable to those within hierarchical collagenous connective tissues. The cell environment was optimized by preferentially attaching cells to poly(HEMA) rods. Cells in vivo were able to attach around collagen fibers (10-50 μm) exhibiting a horseshoe shaped morphology. The rods in this experiment were relatively large (300 μm), and although cells were seen elongating along the surface of the rods, their morphology was more characteristic of attachment to a 2D surface. Nonetheless, housing the rods within the PEG gel created similar fiber-matrix interactions to those seen in normal tissue, and arranging the cells in an organized manner along the encapsulated rods, led to a local strain environment surrounding the cells more similar to that seen during normal tissue loading. Furthermore, manipulating this local strain environment by adjusting the material manufacture process provided a novel mechanism of incorporating controlled levels of both shear and tension at a cell level, allowing investigation into their influence on cell metabolism.

The mechanical characterization of this system at both a macro and micro level were studied to determine how the system responds to loading. The experiment allowed manipulating and optimizing the local strain environment to control cell deformation for mechanotransduction studies. The effects of the local strain environment on cell metabolism were also examined. Mechanotransduction is integral to tissue homeostasis and is also implicated as a controlling factor in degeneration and repair. Improved understanding of the pathways provides valuable insights for tissue engineering; unfortunately, details of mechanotransduction pathways in all tissues remain largely unknown. Studies have demonstrated that the cell metabolic response is regulated by the nature, magnitude and frequency of the applied load. Accordingly, to understand and investigate mechanotransduction, it is desirable to be able to control each of these parameters in a suitably well defined model system, which is based around current understanding of the local strain environment surrounding the cells in vivo.

Previous micromechanical investigations in tendon have indicated that extension of collagen composite materials incorporates the extension and sliding of the collagen components throughout its hierarchical levels. Collagen crosslinks are known to securely bind individual collagen molecules to build fibrils, however the organization and mechanics of the higher structural levels remains less clear. It is believed that non-collagenous matrix components, predominantly glycoproteins, are responsible for maintaining integrity between the fibrils, fibers and higher structural levels of these tissues, and that these enable variable degrees of sliding. Whilst the precise contributions of each of the structural levels to gross mechanics remain unclear, fiber level sliding has been implicated as significant under physiological loading.

Confocal microscopy studies have confirmed that normal physiological loading of tendon, ligament or disc results in the transfer of strain to the cells. However, the high level of shearing between collagen fibers during loading indicates that the cellular strain environment will encompass significant shear as well as possible tension and compression. Furthermore, recent work has indicated that tendons with different functional roles not only demonstrate different gross mechanical characteristics, but also different micromechanics. More highly loaded flexor tendons reported greater levels of fiber shear, suggesting the local strain environment surrounding the cells differs not only between fibrous tissues, but also for subsets of the same tissue. The differences in local cell mechanics may provide a mechanism for cell mediated control of matrix organizational variations in distinct tissues.

The fiber composite structure was developed to mimic aspects of the fiber composite environment of collagenous fibrous tissues. The bulk matrix of the fiber composite was manufactured from crosslinked PEG to represent the non-collagenous matrix components existing between the fibers in tendons. A PEG hydrogel was chosen because it can be fabricated from cytocompatible macromolecular monomers enabling encapsulation of rods when cells are present and the loosely crosslinked PEG network creates a highly hydrated environment mimicking the native tissue environment and permitting facile diffusion of nutrients to the cells and cellular waste out of the gel. For fiber manufacture, crosslinked poly (HEMA) was chosen as the base material for its hydroxyl side groups which were readily modified with proteins to permit cell attachment, and its hydrated environment which permitted controlled diffusion and interpenetration of the bulk PEG hydrogel and the poly(HEMA) fiber rods. By manipulating the manufacturing protocol for the composite namely through differences in the mechanical properties between the bulk matrix and the fibers and through controlling interpenetrating network between the PEG matrix and the poly(HEMA) rods, it was possible to alter the relationship between shear and tension within the rods. This allows precise control over the local strain environment surrounding any incorporated cells, and thus provides an ideal system for investigating cell mechanotransduction under varying strain conditions.

Macro-mechanical analysis of the range of composites developed demonstrated a failure stress two orders of magnitude lower than that of native tendon or ligament. Some aspects of the invention provide adjustments in local mechanics and improved understanding of mechanotransduction, thereby making gross mechanical characteristics of lesser concern. The stiffness of both the PEG and (poly)HEMA can easily be increased through manipulations in the crosslinking density. This experiment showed that the gross mechanics of the material could be altered by changing the manufacturing protocol. For example, allowing the rods to dry prior to soaking in the PEG macromer solution increased both the UTS and the modulus of the composite in a time dependent manner, indicating an improved strength of the shear bond between rods and matrix.

Micro-mechanical analysis allowed the shear interface to be investigated in greater detail. These data indicated that extension of both the COMP-direct and COMP-30 mins groups incorporated a combination of rod extension and rod shearing. However, the longer soak time led to more rod extension and less rod shearing. Such an observation indicates that rod-matrix shear strength can be increased by increasing interpenetrating network. In COMP-direct samples, tensile strains along a rod were around 25% of the strains applied to the gross sample. Allowing the soak time in COMP-30 min samples, increased local tensile strains within fibers to around 30% of applied values, demonstrating how simply the shear/tension environment can be manipulated. These shear/tension ratios compare favorably with those reported in tendon collagen fibers under tensile load, where the tensile strains within the collagen fibers have been shown to range from around 15-30% of the gross applied strain values.

Collagen coating of the rods was successful in promoting cell attachment, and fibroblasts were successfully maintained both on isolated rods, and within the composite for a week. Similar PEG hydrogels have been used extensively as cell carriers for tissue engineering applications. This experiment also confirmed good cell viability in the composite material, with cells located on the (poly)HEMA rods within the PEG, showing good attachment, spreading, and actin cyotskeletal organization. Confocal imaging was successfully adopted to image the cells, demonstrating the feasibility of visualizing tenocytes or fibroblasts during loading of the composite, and thus investigating cell deformation under a range of loading regimes.

An investigation into gene expression by cells encapsulated within the fiber composite and mechanical stimulated, confirmed the applicability of using the system for the future analysis of mechanotransduction pathways. The fiber composite incorporates a 2-D attachment surface with 3-D encapsulation of the cells, dictating the use of two controls, to recreate each of these environments in isolation, and attempt to interpret the data by isolating responses associated with the materials from those associated with the strain environment.

Both encapsulated cell environments had reduced collagen type I gene expression, compared with the 2-D seeded cells. Reduced collagen expression has previously been reported in similar 3-D PEG hydrogels with higher crosslinking densities and was thought to be related to either reduced diffusion limiting growth factors and other large signaling molecules from reaching the cells, or the tight mesh network that restricts matrix evolution and hence matrix deposition. However, the cells responded markedly different under loading, where cells in the fiber composite material had higher normalized collagen expression compared to expression levels in both the 2-D poly(HEMA) and 3-D PEG systems.

By employing the two control environments one can gain some insights into the mechanisms for upregulation of collagen with loading in the fiber composite alone. With both the composite and 2-D poly(HEMA) samples exhibiting strong cell attachment to the same material, the metabolic differences cannot be directly related to cell attachment and spreading on the rod surface. Furthermore, fluid flow in isolation cannot be implicated, as cells are encapsulated in both the PEG 3-D system and the composite. Indeed, data indicate that the metabolic differences recorded in the loaded materials may be a direct response to the local strain environment, with the non-homogenous nature of the composite shielding the cells from a portion of the applied 5% tensile strain, and instead subjecting them to combined tensile/shear strain. Collagen type I expression has been investigated in a range of other systems. Upregulation has been reported at both the gene and protein level in tendon explants subjected to 5% tensile strain. By contrast, isolated cell models have shown varying results, with static load reducing MMP-1 expression in tenocytes, whilst cyclic loads of 3% or greater were needed to create a similar inhibitory response. Intermittent cyclic tensile strains of 2.4% increased collagen type I and III expression by stem cells in a collagen sponge, suggesting strains lower than 5% may be necessary for collagen expression. Indeed, 5% cyclic strain applied to cells on a 2-D membrane in the presence of Il-1β, resulted in an upregulation of degenerative gene expression, not seen with IL-1β alone. Cyclic loading also both upregulated and downregulated cell proliferation when isolated cells were stimulated, depending on the number of loading cycles applied. It is thus evident that cellular response to mechanical stimulation is highly variable, and dependent on both the material environment and the nature of the applied load.

This experiment showed that the fiber composite material is capable of eliciting a uniquely different metabolic response from the cells compared with homogenous materials. Furthermore, data indicate that the response of this composite to loading may also be conducive with matrix synthesis for tissue repair.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A gearless mechanical loading apparatus comprising:
a motor;
a crank element operatively connected to said motor and comprising:
a crank arm, and
a driver link comprising:
a proximal end that is operatively connected to said crank arm by a driver link connector, and
a distal end, whereby when said motor rotationally moves said crank arm, the rotational movement of said crank arm causes the distal end of said driver link to move in an arc;
a joint element operatively connected to said driver link and comprising:
a first compression element comprising a proximal end and a distal end, wherein the distal end of said first compression element is configured such that there is no lateral movement of the distal end of said first compression element,
a second compression element comprising a proximal end and a distal end, and
a main knuckle comprising a hinge that interconnects the proximal ends of said first and second compression elements with the distal end of said driver link; and a linear displacement element comprising:
  a displacement arm comprising:
    a proximal end that is operatively connected to the distal end of said second compression element; and
    a distal end; and
  a guide element operatively connected to said displacement arm such that said guide element causes a substantially pure linear movement of said displacement arm when the distal end of said second compression creates movement of said displacement arm.

2. The gearless mechanical loading apparatus of claim 1, wherein said guide element comprises a piston like element that is operatively connected to said displacement arm and said second compression element such that the movement of the distal end of said second compression element causes purely a linear movement of said displacement arm.

3. The gearless mechanical loading apparatus of claim 1 further comprising:
  a platen that is operatively connected to the distal end of said displacement arm; and
  a base adapted for placing a material to be compressed by said mechanical loading apparatus,
wherein lateral movement of said displacement arm causes said platen to move toward or away from said base thereby compressing or uncompressing the sample.

4. The gearless mechanical loading apparatus of claim 1 further comprising:
  a sample holder element that is operatively connected to the distal end of said displacement arm and is adapted to attaching a sample; and
  a sample placement element adapted for removably attaching a sample,
wherein lateral movement of said displacement arm causes said sample holder element to move toward or away from said sample placement element thereby (i) stretching or unstretching the sample or (ii) compressing or uncompressing the sample.

5. The gearless mechanical loading apparatus of claim 1, wherein the lateral movement of said displacement arm is about 10 mm or less.

6. The gearless mechanical loading apparatus of claim 1, wherein the total lateral movement of said displacement arm is about 5 mm or less.

7. The gearless mechanical loading apparatus of claim 1, wherein the lateral movement of said displacement arm is about 3 mm or less.

* * * * *